United States Patent
Richards et al.

(10) Patent No.: US 8,594,018 B2
(45) Date of Patent: Nov. 26, 2013

(54) RANGING FOR WIRELESS RADIO FREQUENCY COMMUNICATION DEVICES

(76) Inventors: Anthony Richards, Borehamwood (GB); Stephen Braithwaite, Highfield (GB); Andrew Ackland, Bitterne (GB)

(*) Notice: Subject to any disclaimer, the term of this patent is extended or adjusted under 35 U.S.C. 154(b) by 164 days.

(21) Appl. No.: 12/995,183

(22) PCT Filed: May 28, 2009

(86) PCT No.: PCT/IB2009/005998
§ 371 (c)(1), (2), (4) Date: Mar. 3, 2011

(87) PCT Pub. No.: WO2009/144582
PCT Pub. Date: Dec. 3, 2009

(65) Prior Publication Data
US 2011/0149779 A1 Jun. 23, 2011

Related U.S. Application Data

(60) Provisional application No. 61/056,517, filed on May 28, 2008.

(51) Int. Cl.
*H04W 4/00* (2009.01)

(52) U.S. Cl.
USPC .............................. 370/328; 342/118

(58) Field of Classification Search
USPC ............... 370/328–339, 350; 455/404.2, 455/456.1–457; 342/47, 118, 342/357.22–357.28, 468
See application file for complete search history.

(56) References Cited

U.S. PATENT DOCUMENTS 8,330,648 B2 * 12/2012 Park et al. ................ 342/107
2006/0258298 A1 * 11/2006 Kim et al. ................ 455/69

OTHER PUBLICATIONS

Sahinoglu et al, Ultra-wideband positioning systems, Cambridge, 263 pages, 2008.*

* cited by examiner

*Primary Examiner* — Frank Duong
(74) *Attorney, Agent, or Firm* — Michael A. Scaturro

(57) ABSTRACT

The present invention relates generally to methods and systems for radio ranging and more particularly to methods and systems for determining time of arrival (TOA) of a ranging signal at a reference wireless device in order to determine distance between the reference wireless device and a target wireless device.

10 Claims, 13 Drawing Sheets

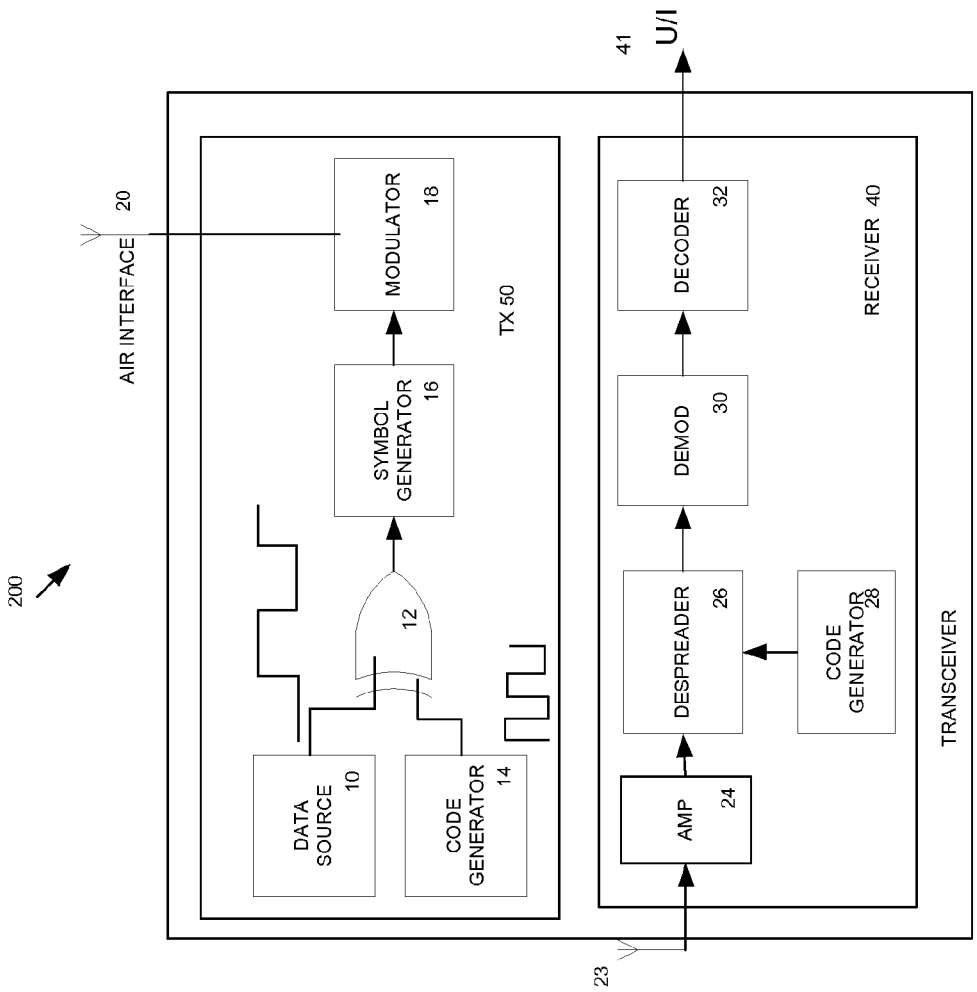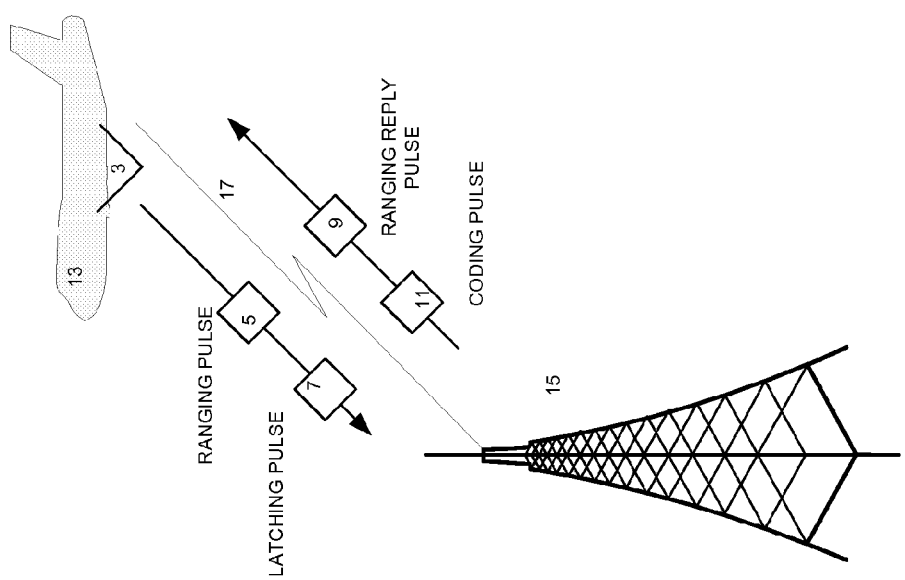
FIG2. PRIOR ART
FIG. 1 PRIOR ART

RANGING FOR WIRELESS RADIO FREQUENCY COMMUNICATION DEVICES

CROSS REFERENCE TO RELATED APPLICATIONS

This application is a United States national phase entry of PCT application No. PCT/IB2009/005998 filed May 28, 2009 with the International Bureau and claims benefit of priority to U.S. provisional application Ser. No. 61/056,517, entitled: System and Method for Accurate Determination of TOA in a Ranging Receiver, naming the same inventors, filed May 28, 2008 in the USPTO, the entire specification of which is incorporated herein by reference in its entirety.

FIELD OF THE INVENTION

The present invention relates generally to methods and systems for radio ranging and more particularly to methods and systems for determining time of arrival (TOA) of a ranging signal at a reference wireless device in order to determine distance between the reference wireless device and a target wireless device.

BACKGROUND OF THE INVENTION

Ranging is a process or method to determine distance from one device to another device. In the context of the present invention, 'ranging' refers to processes for directly measuring distance between a first transceiver and a second transceiver and for providing the measured distance information to a user of a transceiver device. Conventional radio ranging devices include Radio Distance and Ranging (RADAR) and Distance Measuring Equipment (DME). For purposes of this specification the term "ranging" is distinguished from the terms "positioning" and "locating" in that the latter terms refer to processes that determine location, in space, of a device. Alternatively, 'positioning' and 'locating' generally refer to determining a position of a first device relative to a position of at least one other device having a defined or known position.

Conventional ranging systems, for example DME systems, typically comprise a UHF transmitter/receiver (interrogator) in an aircraft and a UHF receiver/transmitter (transponder) on the ground. The aircraft interrogates the ground transponder with a series of pulse-pairs (interrogations). The ground station replies with an identical sequence of reply pulse-pairs characterized by a predetermined time delay, for example 50 microseconds. The DME receiver in the aircraft searches for pulse-pairs that match the individual aircraft's unique interrogation pattern.

When the aircraft interrogator matches a received pulse sequence with its unique interrogation sequence the interrogator locks onto the received signal. A radio pulse takes around 12.36 microseconds to travel one nautical mile (1.9 km) to and from, this is also referred to as a radar-mile. The time difference between interrogation and reply minus the 50 microsecond ground transponder delay is measured by the interrogator's timing circuitry and translated into a distance measurement in nautical miles which is then displayed in the cockpit.

Global positioning system (GPS) receivers determine location by measuring the propagation delay of specially constructed signals transmitted by GPS satellites. GPS signals comprise a relatively long Pseudo Random Noise (PRN) Coarse/Acquisition (C/A) code, a timing reference and sufficient data to support generation of a position solution by a GPS signal receiver. Propagation delay between GPS satellite and the GPS receiver is determined by applying code correlation techniques to the received GPS signal in the receiver to determine time of arrival (TOA) of the signal. The GPS receiver compares the TOA of the GPS signal to the transmitted timing reference portion of the signal. The time difference is used to calculate range from the receiver to the transmitting GPS satellite. The GPS receiver's position is determined by the geometric intersection of a plurality of simultaneously observed ranges from satellites with known coordinates in space.

GPS receivers work well for determining a receiver's location, i.e., position in space. However, a GPS range determination made by such receivers is carried out only as an intermediate calculation in a GPS location solution. A direct measurement of range between a user's GPS receiver and a transmitting satellite is not of interest to a typical user of a GPS receiver device. In other words a distance between a receiver and a GPS satellite with known coordinates is calculated only as part of an algorithm that relies on a plurality of such calculated distances to determine the receiver's position. In that sense, GPS systems are not 'ranging' systems, as the term ranging is defined in this specification, because GPS receivers cannot directly determine the distance between them.

Direct ranging from one device to another would be useful in many applications where distance from a reference device to a target device is of interest. For example, the ability to directly, rapidly and accurately determine distance from one fire-fighter to another, from a lost person to a rescuer, from a police officer to stolen property, etc. would provide a significant advantage in law enforcement, fire-fighting, and search and rescue operations. Therefore, portable ranging devices that can be carried on a person or affixed to an object would be desirable.

Conventional ranging systems like DME and RADAR are capable of directly determining range from one transceiver to another. However, they operate using specialized ranging circuits, ranging signals and ranging techniques. These circuits, signals and techniques are incompatible with the components and circuits used to carry out communication of information other than position information. For example, to provide DME-like circuits in a cellular telephone, a pulse pair generator and dedicated timing circuits would be required, in addition to providing typical communication circuits for functions like voice and text messaging. Such adaptation of existing communication devices to include conventional ranging circuits would impose significant burdens on, among other things, the device's operational efficiency, as well as device size, weight and power consumption.

It would be desirable to provide multi-purpose wireless communication devices capable of 'ranging', that is, of directly measuring distance between them. Further, it would be desirable to equip wireless communication devices used for video, text and audio communication with ranging capability, without the need for dedicated range timing circuits in these devices. It would further be desirable to provide ranging features in wireless communication devices while meeting bandwidth, power and other constraints imposed on wireless communications systems by international standards such as, for example, IEEE 802.15.4 and IEEE 802.11.

Ranging devices can be divided into two general categories, depending on how a device uses a received ranging signal in making a distance determination. A first category of devices relies on measurable properties of a received itself as indicators of distance of the signal transmitter from the signal receiver. For example, some ranging devices rely on received signal strength (RSS) as an indicator of relative range of a signal transmitting device with respect to the device receiving the transmitted signal. Another device in the first category measures bit error rate of information recovered from a received signal. Other devices in the first category include those that measure at least one of: phase, amplitude, phase and amplitude (I and Q), frequency and channel response of a received signal.

A second category of ranging devices determines distance based, at least in part, on determining a time of arrival (TOA) of a ranging signal at a distance measuring receiver. DME, as discussed above, is one example of devices falling into this second category. Impulse radio devices adapted for ranging, for example, Ultra Wideband (UWB) devices typically rely on TOA estimations of high-bandwidth ranging pulses to make distance determinations. For this second category of device, the accuracy of a device's distance measurement directly depends on the accuracy of at least one associated TOA measurement.

Therefore accuracy of a Time of arrival (TOA) estimate is an important consideration in implementing ranging functions. It would be desirable to have a communications transceiver capable of radio ranging and also capable of determining TOA with the highest possible accuracy. TOA estimation using ultra-wideband (UWB) signals provides a suitable ranging technique for indoor positioning applications which call for high levels of position accuracy. However, UWB systems have drawbacks including distance limitations, complexity and power consumption considerations associated with broad bandwidth signal processing.

Therefore, it would be desirable to provide ranging features in a narrowband wireless communication device. Further it would be desirable to achieve high accuracy in TOA measurements while meeting bandwidth, power and other constraints imposed on wireless communications systems by international standards such as, for example, IEEE 802.15.4 and IEEE 802.11.

DESCRIPTION OF THE DRAWING FIGURES

These and other objects, features and advantages of the invention will be apparent from a consideration of the following detailed description of the invention considered in conjunction with the drawing figures, in which:

FIG. 1 is pictorial diagram illustrating the function of conventional distance measuring equipment (DME) employing a round trip time of flight (TOF) radio ranging technique according to the prior art.

FIG. 2 is a block diagram illustrating a conventional Direct Sequence (DS) Code Division Multiple Access (CDMA) modulator/demodulator (modem) and coder/decoder (codec) of a type suitable for implementing various embodiments of the invention described herein.

DETAILED DESCRIPTION OF THE INVENTION

FIG. 1

Figure 3:
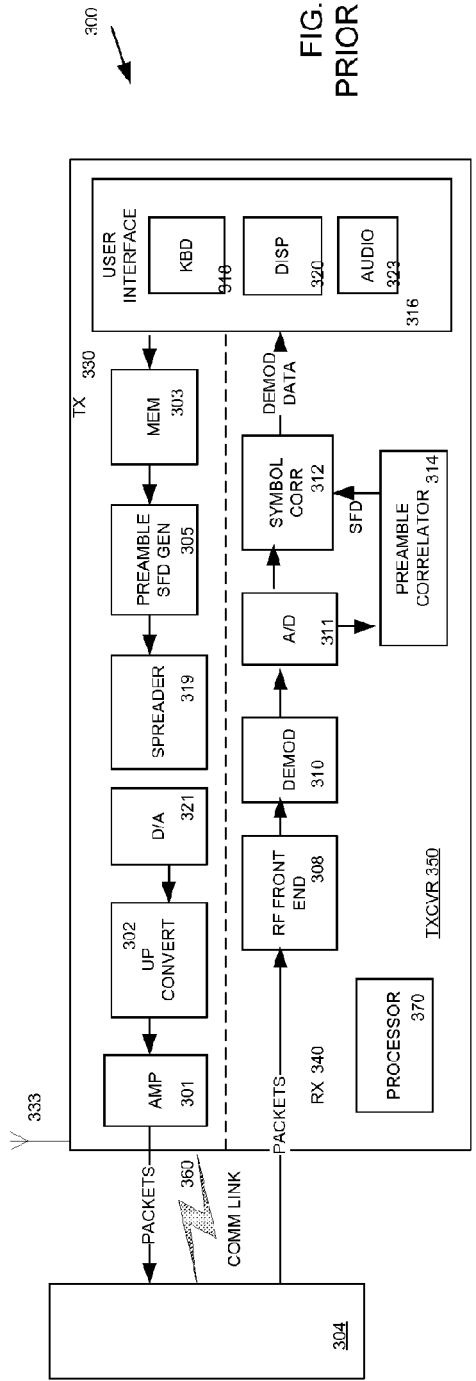
FIG. 3 is a block diagram of a wireless device employing a DS CDMA scheme suitable for implementing various embodiments of the invention described.

FIG. 1 illustrates conventional distance measuring equipment (DME) comprising a fixed terrestrial station 15 and mobile interrogator 2. Interrogator 2 determines line of sight (in this example slant range) from interrogator 2 to station 15. To determine range, interrogator 2 transmits a pulse pair comprising a ranging pulse 5 and a latching pulse 7 to station 15. In response to receiving the pulse pair, station 15 transmits a corresponding pulse pair comprising a ranging reply pulse 9 and a coding pulse 11. In some DME station 15 delays transmitting its response to interrogator 3 by a fixed amount of time. Interrogator 2 determines round trip time of flight (TOF) by measuring elapsed time between the transmission of ranging pulse pair 5, 7 and receiving ranging reply pulse pair 9, 11. In order to make this calculation, interrogator 2 deducts from the total elapsed time, any delay period between the time station 15 received the interrogation pulse pair and the time station 15 sends the corresponding reply pulse pair. This delay time is referred to herein as "turnaround time" ($T_{TA}$).

FIG. 2

FIG. 2 is a block diagram illustrating a transceiver device 200 implemented using a conventional Direct Sequence (DS) Code Division Multiple Access (CDMA) modulator/demodulator (modem) and coder/decoder (codec) of a type suitable for implementing various embodiments of the invention described herein. In general, a transmitter 50 comprises a source 10 of digital data which may comprise a data terminal or a speech coder. The output from the source 10 comprises a stream of bits having a frequency F bits per second. The stream of bits is applied to a digital multiplier such as an EX-OR gate 12.

A pseudo-random code generator 14 generates a coding sequence expressed in chips per bit, for example N chips per bit, which is applied to the EX-OR gate 12. The output of the EX-OR gate 12 comprises a stream of chips having a frequency F×N chips per second. Thus for example if F=10 db/s and N=1000 then the chip rate is 10 M chips/second. The output from the EX-OR gate 12 is applied to a symbol generator 16 which in turn is coupled to a digital modulator (or mapper) 18 and finally to an antenna 20. One effect of spreading the spectrum of digital data from the source 10 is to spread the energy in the signal over a wider bandwidth so that it appears as noise.

A receiver 40 comprises an antenna 23 connected to an RF amplifying stage 24. The received signal is then passed to a despreading stage 26 which is supplied with the same coding sequence from a code generator 28. In a simplified version of the receiver, the stage 26 comprises an EX-OR stage whose output is a signal at the bit rate. Stages 26, 28 synchronize the locally generated code sequence with that in the signal, for example, by means of correlation. Stages 26-28 also deal with multiple path intersymbol interference due to portions of the transmitted signal being reflected by obstructions in the communication path.

Additionally, for embodiments of the invention wherein other differently coded users use the same frequency channel, additional circuits for reducing and/or eliminating the effects of interference due to the other users whose codes may have different rates are typically supplied to cope with these problems. The bit rate signal from stage 26 is applied to a demodulator 30, then to a decoder 32 after which the recovered signal is applied to user equipment (not shown) such as a display device or speech decoder.

FIG. 3

FIG. 3 is a block diagram of a conventional wireless communication device 300 suitable for implementing embodiments of the invention. Device 300 comprises a transceiver 350 and also typically comprises a user interface 316. User interface 316 enables a user to operate device 300 to carry out wireless communication via transceiver 350. For example, device 300 is operable by a user via keyboard 318. Some types of devices 300 include a display 320 for displaying to a user, information communicated to device 300 via a communications link 360.

Transceivers of the type illustrated in FIG. 3 are commercially available, for example, from Texas Instruments (TI). One TI product suitable for implementing transceiver 350 is the Chipcon device, CC2420. For embodiments of the invention deploying the CC2420 a microcontroller, for example, PIC 18F26xx or an equivalent device, is coupled to the CC2420 to provide basic control functions. Another device available from TI is Chipcon's CC2430, a so called "RF System on a Chip". However, transceiver 350 illustrated in FIG. 3 need not be implemented with any particular chip or microcontroller. Instead, discrete components including commercially available processors, controllers, programmable logic devices and a variety of fixed devices may be configured generally in accordance with the diagram of FIG. 3 so as to perform the same general functions. Any combination of devices providing the functions illustrated in FIG. 3 and described herein are suitable for implementing various embodiments of the invention.

Device 300 has a wide variety of applications, including radio frequency identification (RFID). The term Radio-frequency identification (RFID) refers the use of an RFID tag applied to or incorporated into a product, animal, or person for the purpose of identification and tracking using radio waves. There are generally two types of RFID tags: active RFID tags, which contain a battery and can transmit signals autonomously, and passive RFID tags, which have no battery and require an external source to provoke signal transmission.

RFID tags are "read" by a scanner or other reading device by bringing the tag in proximity to the scanner, or by transmission of radio waves between the devices so as to identify the tags and in some cases obtain information related to tagged items. In addition to RFID applications, additional applications for transceiver 350 include contactless payments and secure ID applications, to name but a few.

For purposes of illustrating device to device communication, two transceiver devices, 301 and 300 are illustrated in FIG. 3. However, only device 300 will be described herein in detail. Transceiver device 301 can be a substantially identical transceiver or any transceiver adapted for communication with transceiver 350 via communication link 360. One implementation of transceiver 350 suitable for implementing embodiments of the invention includes packet communications transceivers. Such transceivers are configurable for operation in, for example, an Industrial Scientific Medical (ISM) Band.

Transceivers like transceiver 350 are also configurable in accordance with the ZigBee specification. Zigbee specifies a small, low-power transceiver based on the IEEE 802.15.4-2003 standard for wireless personal area networks (WPANs), such as wireless headphones connecting with cell phones via short-range radio. Additional applications for transceiver 350 include a variety of short-range communication applications in the 315/433/868/915 MHz, and 2.4 GHz frequency bands.

Transceiver 350 is also configurable to meet IEEE standard specifications such as comprise the 802.11 family of standards. Accordingly, device 300 can be implemented in a variety of wireless network devices. For example transceiver 350 can be implemented in a base station while device 301 is implemented in a mobile device, such as a cellular telephone. In other configurations, transceiver 350 is implemented in a home network device such as a desktop or laptop computer or processor.

As illustrated in FIG. 3, device 350 comprises a low-IF receiver 340. An RF signal is received at RF front end 308 where the received signal may be amplified by a low noise amplifier (not shown). A demodulator 310 down-converts the received signal in quadrature (I and Q) to the intermediate frequency (IF). The complex I/Q signal is filtered and amplified, and then digitized by the AD converter 311. Symbol correlation is performed digitally by symbol correlator 312 and preamble correlation is performed by preamble correlator 317. When preamble correlator 317 of receiver 340 detects a start of frame delimiter, an indicator SFD is provided to symbol correlator 312. Device 300 may buffer the received data in a memory such as a 128 byte receive FIFO (not shown). The received or buffered data is made available for use by processor 370 and thereby to devices coupled to user interface 316.

Transmitter 330 is based on direct up-conversion. The data to be transmitted is buffered in a 128 byte transmit FIFO 304, which may be separate from the receive FIFO. The preamble and start of frame delimiter are generated by generator 305. In one example implementation, each symbol (4 bits) is spread by spreader 319 using the IEEE 802.15.4 spreading sequence to 32 chips and output to digital-to-analog converter 321. An analog low pass filter passes the signal to a quadrature (I and Q) up-conversion mixer 302. The RF signal is amplified in a power amplifier (not shown) and fed to antenna 333.

In embodiments of the invention described herein, application device 300 is coupled to a microcontroller 370. Microcontroller 370 is configured to program transceiver 350 into different modes, read and write buffered data and read status information via a 4-wire SPI-bus configuration interface (SI, SO, SCLK and CSn) (not shown). Transceiver 350 and microcontroller 370 further include a plurality of general purpose counters (not shown) for implementing the special purpose counters used by the various embodiments of the invention. In one embodiment of the invention microcontroller 370 comprises a PIC 18F26xx or equivalent device and includes internal read only memory (RAM) and flash memory.

FIG. 4

Figure 4:
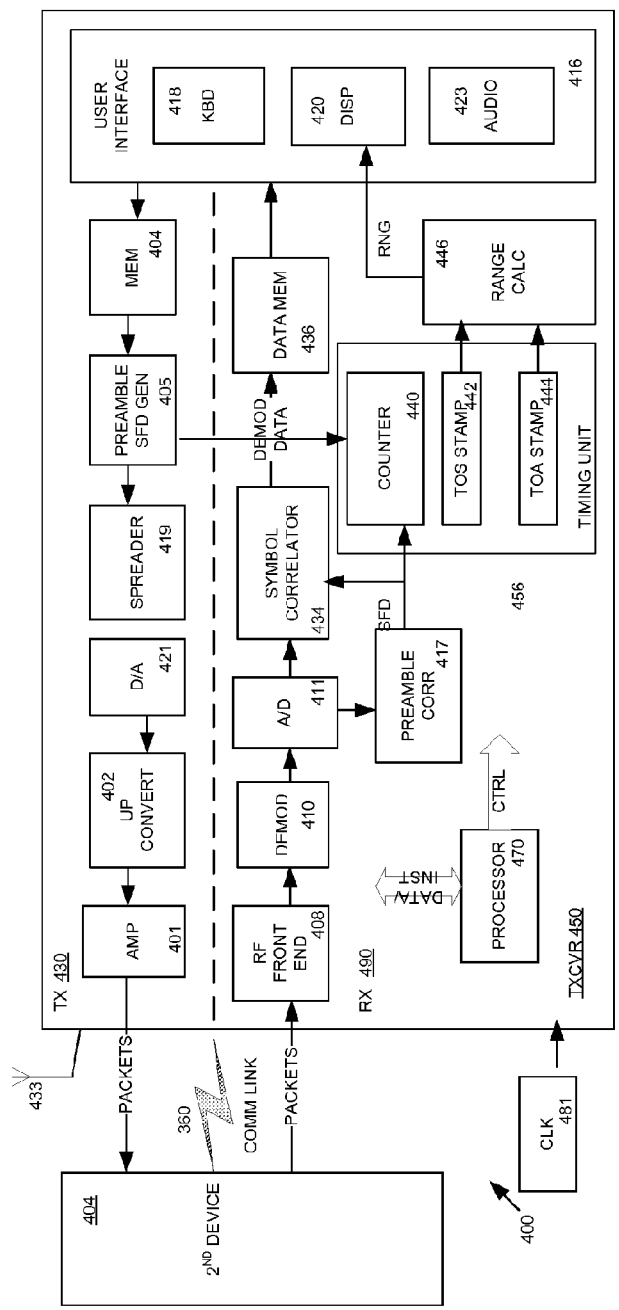
FIG. 4 is block diagram of a communication device configured to provide radio ranging in accordance with an embodiment of the invention.

FIG. 4 is block diagram of a communication device 400 configured to provide radio ranging in accordance with an embodiment of the invention. As illustrated in FIG. 4, device 450 comprises a low-IF receiver 490. An RF signal is received at RF front end 408 where the received signal may be amplified by a low noise amplifier (not shown). A demodulator 410 down-converts the received signal in quadrature (I and Q) to the intermediate frequency (IF). The complex I/Q signal is filtered and amplified, and then digitized by the AD converter 411. Symbol correlation is performed digitally by symbol correlator 434 and preamble correlation is performed by preamble correlator 417. When preamble correlator 417 of receiver 490 detects a start of frame delimiter, an indicator SFD is provided to symbol correlator 434. Device 400 may buffer the received data in a memory such as a 128 byte receive FIFO (not shown). The received or buffered data is made available for use by devices coupled to user interface 416.

Transmitter 430 is based on direct up-conversion. The data to be transmitted is buffered in a 128 byte transmit FIFO 404, which may be separate from the receive FIFO. The preamble and start of frame delimiter are generated by generator 405. In one example implementation, each symbol (4 bits) is spread by spreader 419 using the IEEE 802.15.4 spreading sequence to 32 chips and output to digital-to-analog converter 421. An analog low pass filter passes the signal to a quadrature (I and Q) up-conversion mixer 402. The RF signal is amplified in a power amplifier (not shown) and fed to antenna 433.

In a typical application device 400 is coupled a microcontroller 470. Microcontroller 470 is configured to program transceiver 450 into different modes, read and write buffered data and read status information via a 4-wire SPI-bus configuration interface (SI, SO, SCLK and CSn) (not shown). Transceiver 450 and microcontroller 470 further include a plurality of general purpose counters (not shown). In one embodiment of the invention microcontroller 470 comprises a PIC 18F26xx or equivalent device and includes internal read only memory (RAM) and flash memory.

In contrast with device 300 of FIG. 3, device 400 includes a timing unit 456. Timing unit 456 comprises range counter 440, TOS stamp 442 and TOA stamp 444. A range calculator 446 is coupled to timing unit 456. Timing unit 456 is further coupled to preamble SFD generator 405 of transmitter portion 430 to receive an indication of generating an SFD for a packet to be transmitted. Responsive to receiving the SFD indicator from generator 405, a value stored in counter 440 is recorded as TOS stamp 442.

Timing unit 456 is further coupled to preamble correlator 417 to receive an indication that receiver portion 490 of transceiver 450 has detected an SFD. Upon receiving the SFD indicator from preamble correlator 417, timing unit 456 records a value of counter 440 as TOA stamp 444. Range calculator 446 receives TOS stamp value 442 and TOA stamp value 444. Range calculator 446 calculates range to a second device, for example device 404, based on the TOS and TOA stamp values. In some embodiments of the invention, range calculator 446 also receives an indication of turnaround delay introduced by second device 404.

In one embodiment of the invention second device 404 inserts the turnaround delay value in packets to be transmitted from second device 404 to device 400. In that manner, range calculator 446 is enabled to account for turnaround time when calculating range. Range calculator 446 provides a calculated range value at its output. In one embodiment of the invention the calculated range value is provided to user interface 416 where the value is displayed to a user on display device 420.

When configured in accordance with FIG. 4 and the foregoing description of the invention, device 400 is enabled to perform ranging, that is, to determine distance from device 400 to target device such as second device 404. Advantageously, the distance determination can be made without the need for generating or transmitting a separate or specialized ranging signal. Further, a range determination can be carried out while device 400 is communicating using conventional communication packets and simultaneously with device 400 communicating with target device 404.

FIG. 5

Figure 5:
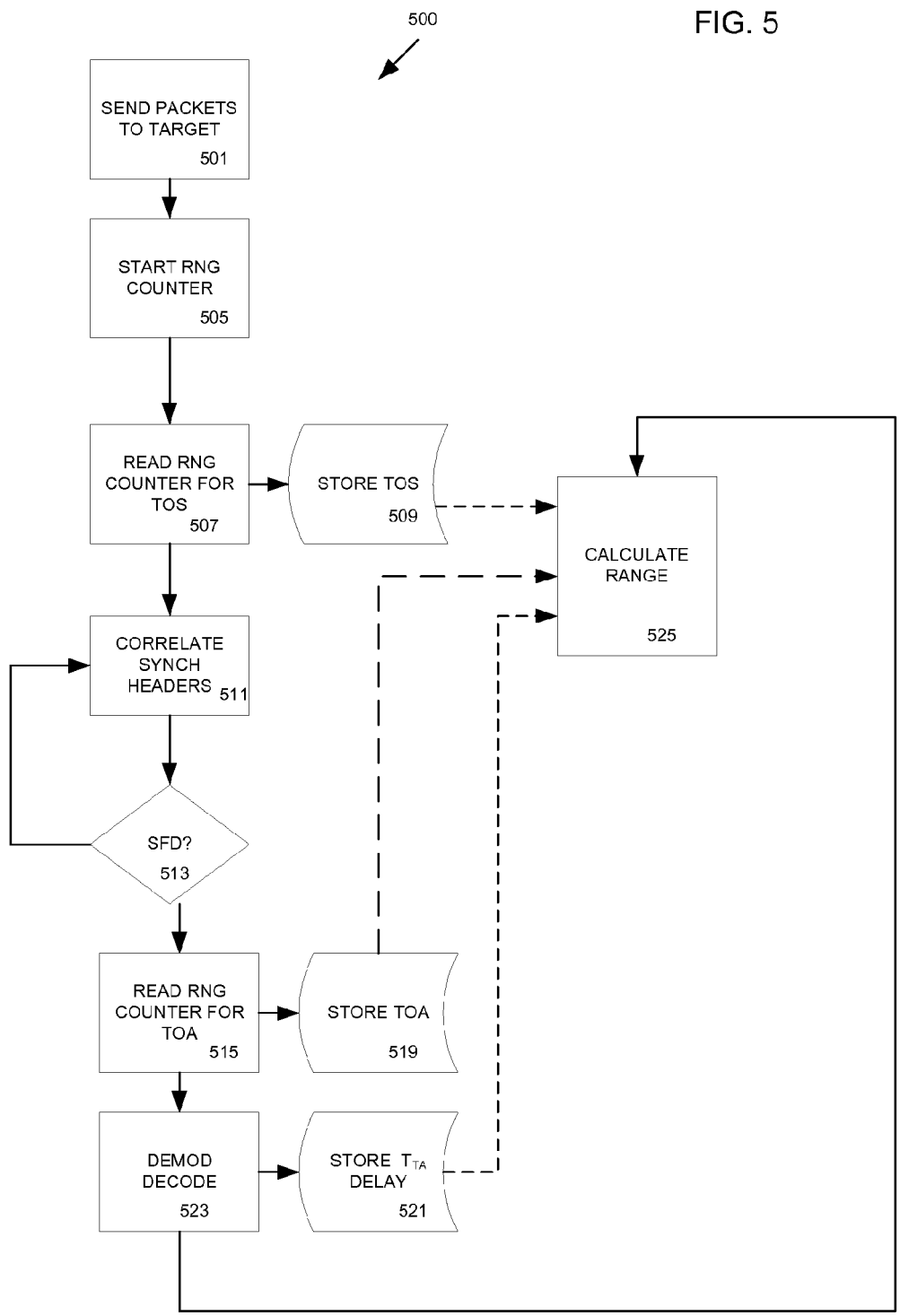
FIG. 5 is a flowchart illustrating steps of a method for radio ranging in a DS CDMA communication device of the type illustrated in FIG. 4 according to an embodiment of the invention.

FIG. 5 is a flowchart illustrating steps of a method 500 for radio ranging in a DS CDMA communication device according to an embodiment implemented using, for example, the device 400 of the invention illustrated in FIG. 4. For ease of discussion, the steps of method 500 are described below with reference to specific components of the devices illustrated in FIG. 4. However, it will be understood, devices other that those illustrated in FIG. 4 are suitable for implementing various embodiments of the invention. For example, one embodiment of the invention is implemented using an ATMEL AT86RF23X. Regardless of the particular transceiver device used to implement embodiments of the invention, the steps of method 500 are carried out to effect ranging features and functions in the implementing device in accordance with embodiments of the invention.

For example, the steps of method 500 are carried out to determine range of a target device, e.g., device 404, from a reference device such as device 400. At 501 transmitter portion 470 sends communication packets to a target device, for example, device 404. At 505, range counter 440 is started if not already running. In one embodiment of the invention, range counter 431 counts in accordance with a clock, for example clock 481 illustrated in FIG. 4.

At 501 transmitter portion 430 receives a send packet command from processor 470. In response to the command transmitter portion 430 initiates transmission of packets to a target device. At 505, range counter 440 is started, if not running. At 507, range counter 440 is read to obtain its count. At 509 the count is stored. Receiver portion 490 correlates received synch headers at 511 to detect patterns corresponding to its transmitted packets. When a matching synch header is detected, preamble correlator 438 of receiver portion 480 provides an indication (SFD) that a frame is about to start. At step 513, receiver portion 480 determines if an SFD has been provided by preamble correlator 417.

If an SFD is detected, indicating a received matching packet, range counter 440 is read. The count is stored at 519. At 523 the received packet is demodulated and decoded. In one embodiment of the invention, target device 404 transmits information related to turnaround delay ($T_{TA}$) introduced by device 404. The turnaround delay information is recovered from packets received by receiver portion 480. The delay is stored at 521. At 525, range calculator 446 determines distance between device 400 and target device 425 based on the stored TOS count, the stored TOA count and the stored turnaround delay.

FIG. 6

Figure 6:
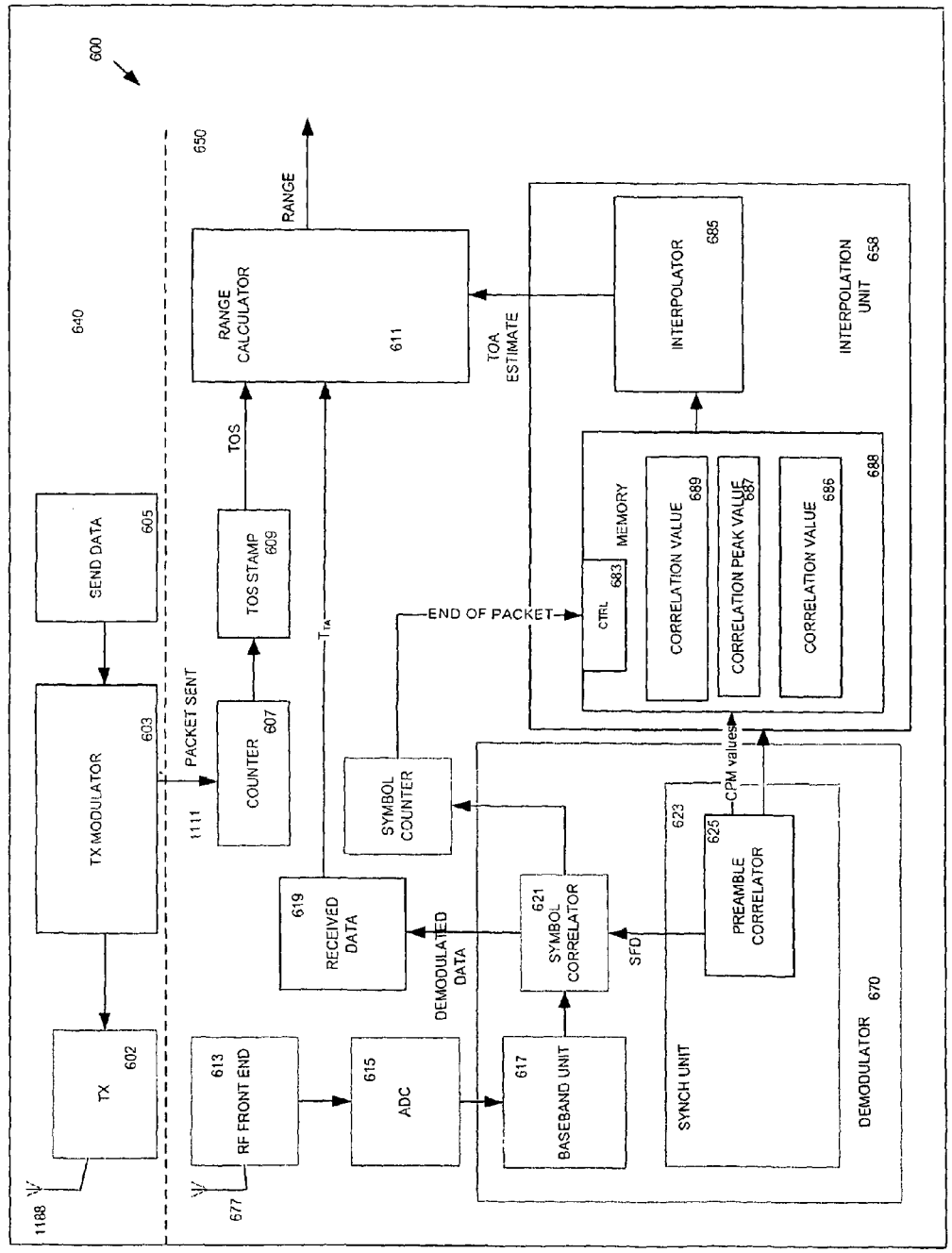
FIG. 6 is a block diagram of a communication device configured for radio ranging according to an embodiment of the invention.

FIG. 6 is a block diagram of a communication device 600 configured to provide radio ranging according to an embodiment of the invention. The embodiment of the invention determines range from receiver 650 to a target transceiver (not shown). Receiver 1066 determines range based on correlation of a synchronization portion of a transmitted message to a synchronization portion of a message received by receiver 650.

As illustrated in FIG. 6 a radio frequency (RF) transceiver 600 comprises an RF transmitter 640 and an RF receiver 650. As will be appreciated by one of ordinary skill in the art, upon reading this specification, transmitter 640 and receiver 650, as illustrated in FIG. 6 are simplified for purposes of explanation. RF transmitter 640 generally comprises a source of data 605 providing data to be transmitted, and a modulator 603 having an input for receiving the data to be transmitted from the source of data 605.

Modulator 603 is configured to modulate data from the source of data 605 onto a carrier signal. The resulting modulated signal is provided to transmitter circuits 602 for transmission by antenna 1188 over an air interface. In one embodiment of the invention, modulator 603 provides an indication of packet transmission 1111. In other embodiments of the invention, other components of transmitter 609 provide an indication of packet transmission. For example, a processor (not shown) controls transmitter 609. The processor initiates transmission of a packet via a start transmission command provided to transmitter 609. In that case, an indication of packet transmission 1111 can be derived from the processor command Regardless of the source of a packet sent indicator, the packet sent indicator 1111 is provided to counter 607 of receiver 650. Receiver 650, in turn, derives a time of send (TOS) stamp 609 from the packet sent indicator.

A direct sequence (DS), code division multiple access (CDMA) modulation scheme is suitable for implementing various embodiments of the invention. However, it is anticipated the invention will find application in other types of modulation schemes, and these remain within the intended scope of the invention. Various embodiments of the invention implement transceiver 600 in accordance with IEEE standards. The selection of a particular IEEE standard to which to transmitter 609 conforms depends on the particular application in which an embodiment of the invention is deployed.

RF receiver 650 comprises an RF front end unit 613 coupled to a receive antenna 677. Receiver 650 detects and decodes received signals to acquire packets having receiver 650 as a destination. An analog to digital converter (ADC) 615 samples RF signals received by RF front end 613. ADC 615 provides corresponding digital samples to baseband unit 617 of demodulator 670.

Baseband unit 617 of demodulator 670 provides down-converted demodulated digital samples to preamble correlator 625 of synchronization unit 623. Preamble correlator 625 correlates preambles of the received down-converted samples and provides an indication of receiving a start of frame delimiter (SFD) when correlator 625 detects a preamble. A symbol correlator 621 receives demodulated samples from baseband unit 615 and recovers data from the samples.

In one embodiment of the invention, payload portions of received packets include an indication ($T_{DD}$) of a delay time attributable to a target transceiver processing. For example, a target transceiver measures the time between receiving a packet transmitted by transmitter 640 and the target transmitter sending a response packet to receiver 650. The target transceiver inserts an indication of that time (referred to herein as 'delay time' ($T_{DD}$)) into packets the target transmitter provides to receiver 650. Alternatively, target transceiver provides a fixed delay time as an indication of turnaround delay. In that case, the demodulated data provided by symbol correlator 621 includes the recovered delay time indicator ($T_{DD}$).

Baseband unit 617 further provides demodulated data to preamble correlator 625 of synchronization unit 623. Preamble correlator 625 detects a preamble of a message having receiver 650 as a destination. Upon detection of the preamble, preamble correlator 625 provides an indication of having detected a start of frame delimiter (SFD). In a typical receiver, the SFD is provided to the symbol correlator for use in synchronizing symbol correlation, for example by symbol correlator 621.

In contrast to conventional methods, according to embodiments of the invention, preamble correlator 625 further provides an SFD indicator to interpolator unit 658. Interpolator unit 658 comprises a memory 688, including a memory controller 683. In one embodiment of the invention memory 688 is provided on integrated circuits implementing the RF transceiver and controller units of transceiver 640. In that case, the controller may perform the control functions for memory 688.

CPM values output from correlator 625 are stored in memory 688. The stored values range, for example, from the $4^{th}$ CPM value (CPM (–4)) before a correlator peak output (CPM (0)) to the $4^{th}$ CPM value (CPM (+4)) after the correlator peak output. Memory 688 provides the stored memory values (examples indicated at 689, 687, 686) to an interpolator 685. Interpolator 685 interpolator 685 interpolates the values stored in memory to determine the correlation peak value.

Interpolator 685 determines TOA based on the correlation peak value obtained by interpolation. The interpolation provides a more accurate estimate for TOA than could be obtained by relying on the maximum output provided by the correlator. In that manner, a more accurate range is provided by range calculator 611 than could be obtained by relying on the correlator output without interpolation.

When correlator 625 detects a preamble and consequently issues a start of frame delimiter (SFD) memory 688 is stopped, that is, no further correlator output values are stored. After the peak value is obtained by interpolator 685, memory 688 is enabled to receive output values from correlator 625. The output of correlator 625 continues to be provided to memory 688 where it is stored until the next SFD is detected by correlator 625.

In one embodiment of the invention the number of samples stored in memory 688 for each received packet is between 5 and 9. However, the invention is not limited with respect to the number of samples stored. Embodiments of the invention storing 9 samples, and embodiments storing as few as 3 samples could be expected to provide usable results depending on the application.

FIG. 6A

Figure 6A:
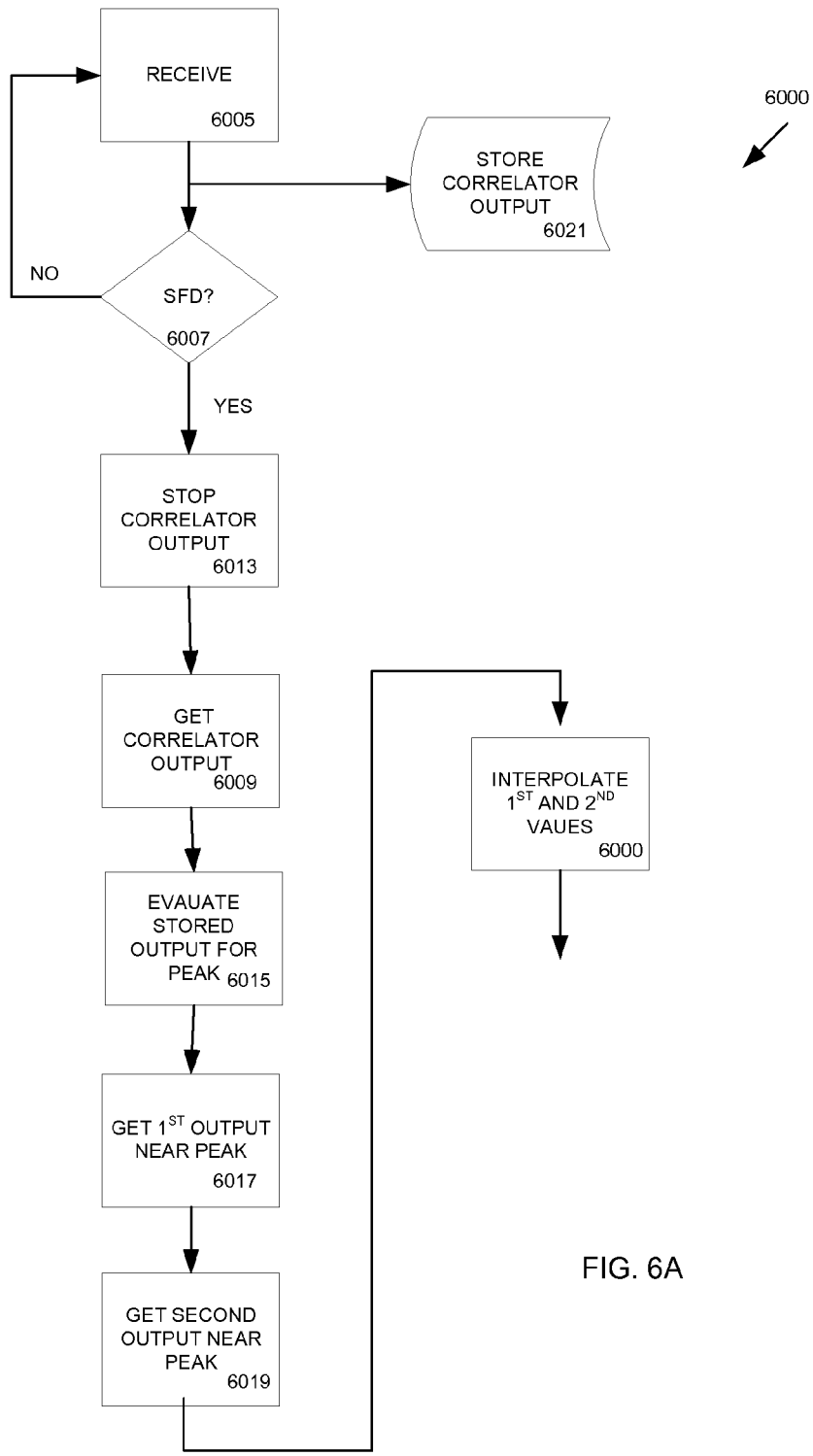
FIG. 6A is a flowchart illustrating a method for radio ranging in accordance with an embodiment of the invention.

FIG. 6A illustrates steps of a method for determining TOA according to an embodiment of the invention. At 6005 a packet is received by receiver 650. The output of correlator 625 is stored. An SFD is detected at 6007. When an SFD is detected, the correlator 625 output is stopped at 6013. Interpolator 685 retrieves the values stored in memory at 6009. Interpolator 685 evaluates the values to determine a peak at 6015. At 6017 interpolator 685 determines a first correlator output value near the peak determined at 6015. At 6019 interpolator 685 determines a second correlator output value near the peak determined at 6015. At 6000 interpolator 6019 interpolates the values determined in 6017 and 6019 to provide an interpolated peak. The interpolated peak is used to determine TOA. The TOA determined in this manner is more accurate than would be obtained if the correlator peak was taken directly and the TOA determined from this single value.

FIG. 6B

Figure 6B:
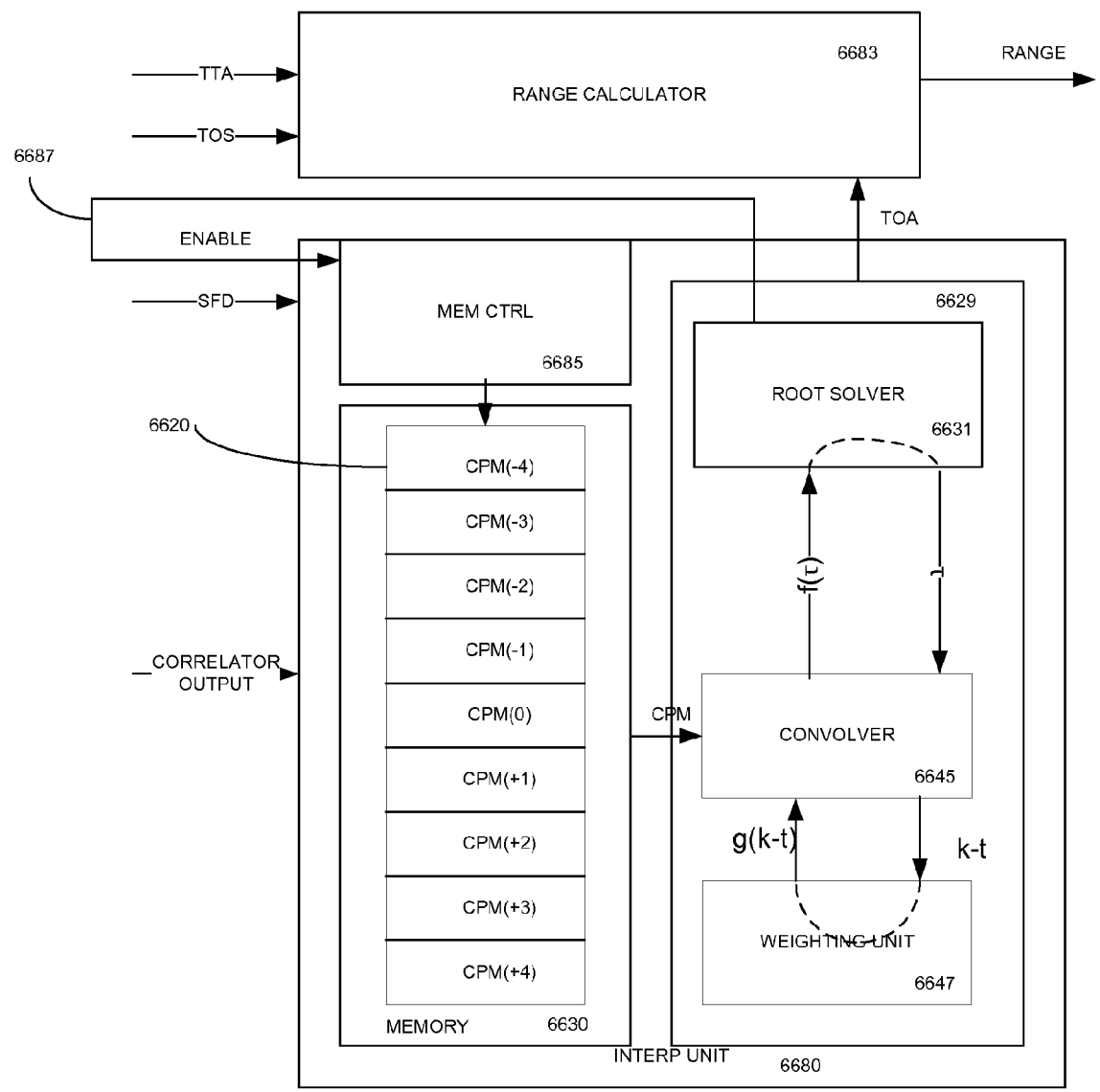
FIG. 6B is a block diagram illustrating details of an embodiment of the invention of the type illustrated in FIG. 6.

FIG. 6B is a block diagram illustrating an alternative embodiment 6629 of the interpolator 685 illustrated in FIG. 6. In the embodiment illustrated in FIG. 6B, interpolating unit 6629 comprises a root solver 6631, a convolver 6645 and a weighting unit 6647.

Convolver 6645

Convolver 645 communicates with memory 6630 via controller 6685 to retrieve the correlator output values 6620, cpm($\tau$), stored in memory, and evaluates the convolution of these values. According to one embodiment of the invention, convolver 6645 accomplishes this by implementing a filtering function. In one embodiment of the invention convolver 6645 g($\tau$) implements a filter function in accordance with the definition of g($\tau$)=d/D$\tau$\{sinc($\tau$)\}. In an alternative embodiment of the invention convolver 6645 implements a filter function in accordance with g($\tau$)=d/d$\tau$\{expected[cpm($\tau$)]\} supplied. However, the invention is not limited to particular choices of filter functions. Generally, any filter function g($\tau$) that provides a derivative of the matched filter for a given implementation is suitable for implementing the filter of convolver 6645.

For example, when the noise in the output of the correlator is correlated, as would be possible for a dominant noise source at the input to the correlator, the matched filter of convolver 6645 has the so called sinc impulse response; and the appropriate choice of filter function is g($\tau$)=d/d$\tau$\{sinc($\tau$)\}. Otherwise if the noise present in the correlator output is uncorrelated, as would be the case if numerical precision of the representation of the correlator output were the dominant source of noise, then the matched filter has an impulse response given by the expected value of the correlator output; and the appropriate choice of filter is g($\tau$)=D/D$\tau$\{expected [cpm($\tau$)]\}.

Root Solver 6631

The convolver 6645 evaluates the convolution, f($\tau$), for time, $\tau$, given by the root solver 631. The root solver 631 determines a new value of $\tau$ that better approximates the value of $\tau$ for which the convolution f($\tau$) is zero. In one embodiment of the invention Root solver 631 is implemented as an iterative root solver, for example implementing Newton's method or a secant method. In one embodiment, Newton's method is used, and the slope of the function whose root is sought is supplied as a constant approximation.

In a DS CDMA embodiment of the invention an appropriate slope is 80. However, those of ordinary skill in the art will appreciate that other modulation schemes will yield ideal CPMs having different slopes. Therefore, the invention is not limited to any particular choice of slope. A variety of choices will be appreciated by those of ordinary skill in the art upon reading this specification. These are intended to remain within the scope of the present invention.

In embodiments of the invention where Newton's method is implemented, the constant approximation is given by the expected value of the derivative of the convolver 6645 at its zero crossing, expected[d/d$\tau$\{f($\tau$)\}] given that f($\tau$)=0. In one embodiment of the invention, root solver 631 begins the process with an initial estimate $\tau$=0, and proceeds until the convergence criterion |f($\tau$)|$\epsilon$ is met, where $\epsilon$ is related to the desired precision of the TOA estimate by the weighting function, g($\tau$), employed. After convergence the value of $\tau$ gives the TOA estimate.

While some embodiments of the invention employ $\tau$=0 as the initial value to implement root solver 6631, usable results could be obtained with values of tau between −1+1. Therefore the invention is intended to cover a wide variety of implementations which will be appreciated by those of ordinary skill in the art upon reading this specification.

Weighting Unit 6647

The weighting function unit 6647 implements a filter weighting function for a convolution implemented by convolver 6645. In one embodiment the weighting function is g($\tau$)=d/dt\{sinc(t)\}. In another embodiment the weigting function g(t)=d/dt\{expect[cpm(t)]\} wherein g(t) represents the impulse response of the convolution embodied in the convolver 6645. Embodiments of the invention will employ a variety of possible functions depending on the noise statistics expected of the output of the correlator 625 (illustrated in FIG. 6) according to the criterion established as described above.

In one embodiment of the invention, device 600, including embodiments of interpolator 658 as disclosed and enabled herein, estimates TOA to an accuracy of up to 12.5 ns RMSE. The TOA estimate at the output of Root Solver 631 is provided to range calculator 611. Range calculator 611 calculates range from receiver 650 to the transmitter providing the packet evaluated by interpolating unit 658. Because the TOA is estimated by the above described interpolator and method, the accuracy of the distance measurement is higher than would be obtained if the inventive interpolator were not employed.

FIG. 7

Figure 7:
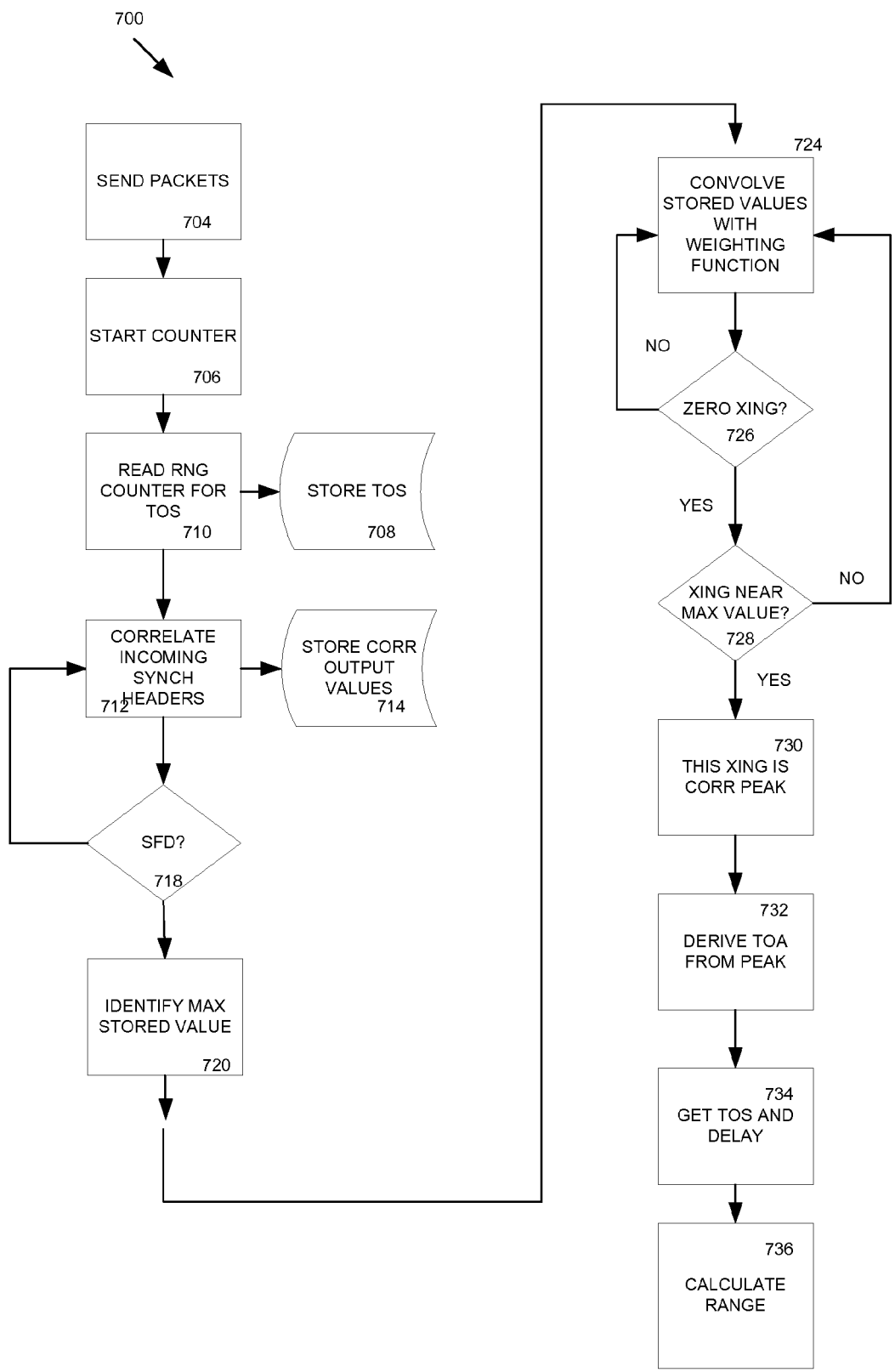
FIG. 7 is a flowchart illustrating steps of a method for radio ranging in a DS CDMA communication device of the type illustrated in FIG. 6.

FIG. 7 is a flowchart illustrating steps of a method for radio ranging in a DS CDMA communication device of the type illustrated in FIG. 6. At 704, transmitter 640 sends communication packets to a target device, for example, device (for example, second device 404 illustrated in FIG. 4). At 706, range counter 607 is started if not already running. In one embodiment of the invention, range counter 607 counts in accordance with a clock, for example, receiver clock 677 illustrated in FIG. 6.

At 710, range counter 607 is read to obtain its count. At 708 the count thus obtained is stored as an indication of time of send (TOS). At 712, preamble correlator 625 of receiver 650 correlates received synch headers to detect patterns corresponding to its transmitted packets. At 714, correlator output values are provided to and stored in CPM memory 688.

When a matching synch header is detected by preamble correlator 625, correlator 625 provides an indication (SFD) that a frame is starting to be received. At step 718, receiver 650 monitors the output of correlator 625 to determine if an SFD has been provided by preamble correlator 625. If an SFD is detected the stored correlator output values are evaluated at step 720 to identify a maximum value. At 722 the stored correlator values are cleared. At 724 stored values are convolved with a derivative of the Sinc function carried out by synchronization unit 625. In an alternative embodiment of the invention, the stored values are convolved with the derivative of the expected (mean) correlator pulse. Such an embodiment may be deployed, for example, when the correlator output noise is white.

At 726 zero crossing results of the convolution are sought. Each identified zero crossing is evaluated to determine if it is near the max value determined at step 720. If a zero crossing is found near the max value determined at step 720, that zero crossing is identified as the correlation peak at 730. At 732 time of arrival is derived from the identified correlation peak. At 736, range is calculated based on the TOA derived at 732 and the stored TOS and delay.

FIG. 8

Figure 8:
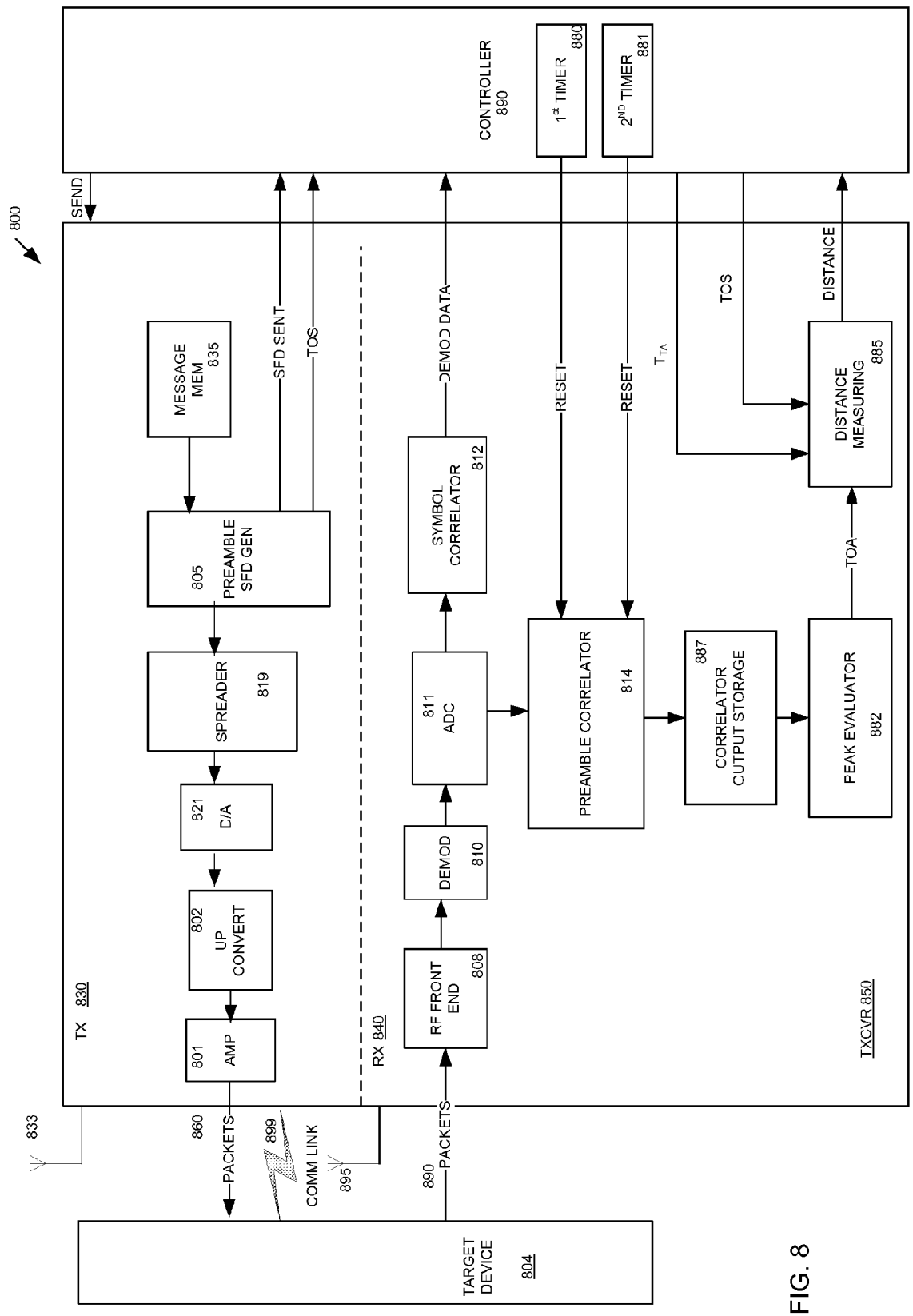
FIG. 8 is a block diagram illustrating a communication device according to an embodiment of the invention.

FIG. 8 is a block diagram of a communication device 800 configured to provide radio ranging according to an embodiment of the invention. Device 800 comprises an RF transceiver 850 coupled to a controller 890. RF Transceiver 850 comprises a transmitter 830 and a receiver 840.

Figure 8A:
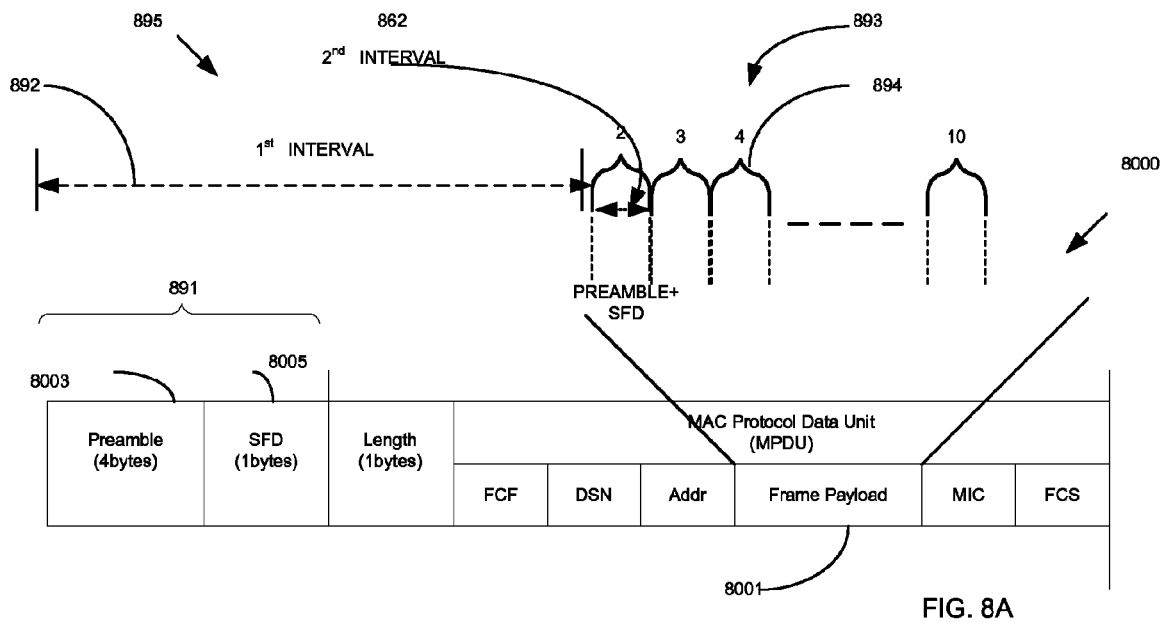
FIG. 8A is a diagram illustrating a communications packet configured in accordance with an embodiment of the invention.

In one embodiment of the invention, controller 890 is configured to cooperate with transceiver 850 to communicate via wireless communication link 899 using packets formatted, for example, as illustrated in FIG. 8A. Turning now to FIG. 8A, format 895 includes a synchronization header portion 891 comprising a four byte preamble portion and a 1 byte start of frame delimiter (SFD). Format 895 further includes a frame payload portion 893.

According to an embodiment of the invention, the frame payload portion is arranged as follows. A plurality of copies (2-20) (an example copy indicated at 894) of the synchronization header is inserted into the frame payload portion. According to an alternative embodiment of the invention, a plurality of copies of only the preamble portion of the synchronization header is inserted into the frame payload portion. In one embodiment of the invention, nine copies are inserted into the frame payload portion. However, various embodiments of the invention will have more or fewer copies, for example between 5 and 7 copies, of the synchronization header (preamble in some embodiments) inserted into the frame payload portion.

Each copy in the frame payload portion is placed adjacent to another copy. In the example illustrated in FIG. 8A, the synchronization header comprises 5 bytes and nine copies are inserted into the frame payload portion. In alternative embodiments of the invention up to 20 copies are placed in the frame payload portion.

A first interval 892 is defined by the number of bits between the start of the packet and the start of the first synchronization header copy (2). A second interval 892 is defined by the number of bits between the start of the first synchronization header copy (2) and the start of the adjacent synchronization header copy (3). Returning now to FIG. 8, device 800 stores a copy of the synchronization header. In one embodiment of the invention the copy is stored in data memory 835 of transceiver 830. In alternative embodiments of the invention the copy is stored in a memory associated with controller 890. Regardless of where the copy is stored, the preamble generator 805 of transceiver 830 inserts a plurality of copies into packets 860 to be transmitted by transmitter 830.

Receiver 840 comprises an RF front end 808, a demodulator 810, an ADC 811 and a symbol correlator 812. RF front end 808 receives RF signals via antenna 895. Received signals are demodulated by demodulator 810 and sampled and digitized by ADC 811. ADC 811 provides the digitized samples to preamble correlator 814. ADC 811 may also store digitized samples in a sample storage memory 884. Preamble correlator 814 operates on the samples it receives to detect a start of frame delimiter. Correlator 814 provides a copy of the correlation output to correlator output storage 887.

Controller 890 implements 1$^{st}$ interval timer 880 and second interval timer 881. First timer 880 provides a reset signal to correlator 814 upon timeout of the first timer 814. Second timer 881 provides a reset signal to correlator 814 upon timeout of the second timer 881. A peak evaluator is coupled to correlator output storage 887 and to sample storage 884. Peak evaluator 882 analyzes the samples in sample storage 884 and the correlator output stored in correlator output storage 887. Peak evaluator 882 provides a time of arrival (TOA) indication to distance measuring unit 885 based on the results of the analysis. Distance measuring unit 885 determines distance from unit 800 to a target unit, represented in FIG. 8 by target device 804. The determination is made based, at least in part, on the TOA indication received from peak evaluator 882.

In some embodiments of the invention, target device 804 provides an indication of its device turnaround delay time. Target device 804 does this by inserting the delay time in messages it transmits to unit 800 in response to messages it receives from unit 800. In that case, the turnaround delay time is provided to controller 890 as part of the demodulated data recovered from message packets received from target device 884. In other embodiments of the invention a fixed delay time is predetermined In that case, distance measuring unit 885 determines distance using the fixed delay time.

FIG. 8A

FIG. 8A is a conceptual illustration of a packet format suitable for implementing the embodiment of the invention of the type illustrated in FIG. 8. A preamble 8003 and a start of frame delimiter (SFD) comprise a synchronization header 891. In one embodiment of the invention, preamble generator 805 of transmitter 830 (illustrated in FIG. 8) is configured to insert copies of synchronization header 891 of a packet, into frame payload portion 8001 as described above.

FIG. 8B

Figure 8B:
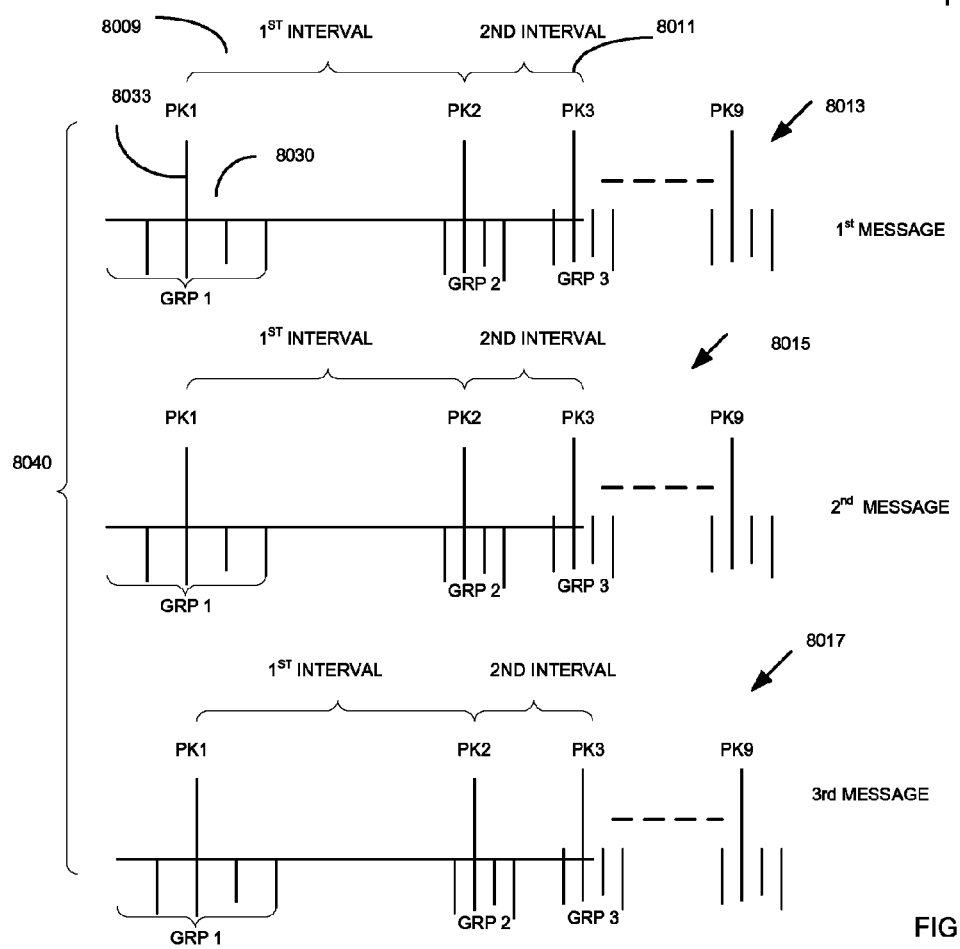
FIG. 8B is a conceptual illustration of an embodiment of the invention of the type illustrated in FIG. 8.

FIG. 8B is a conceptual illustration of an embodiment of the invention of the type illustrated in FIG. 8. As a result of the transceiver being configured to insert copies of the preamble into the payload portion of a packet, the output of preamble correlator 814 for a received packet will comprise a plurality of correlator peaks (e.g. PK1, PK2, etc. As described above, this technique provides an advantage over methods which obtain only one correlator peak per message in that the actual peak can be more accurately estimated. As a result, TOA can be estimated more accurately than would be the case if a single correlator peak were relied upon for an estimate.

FIG. 9

Figure 9:
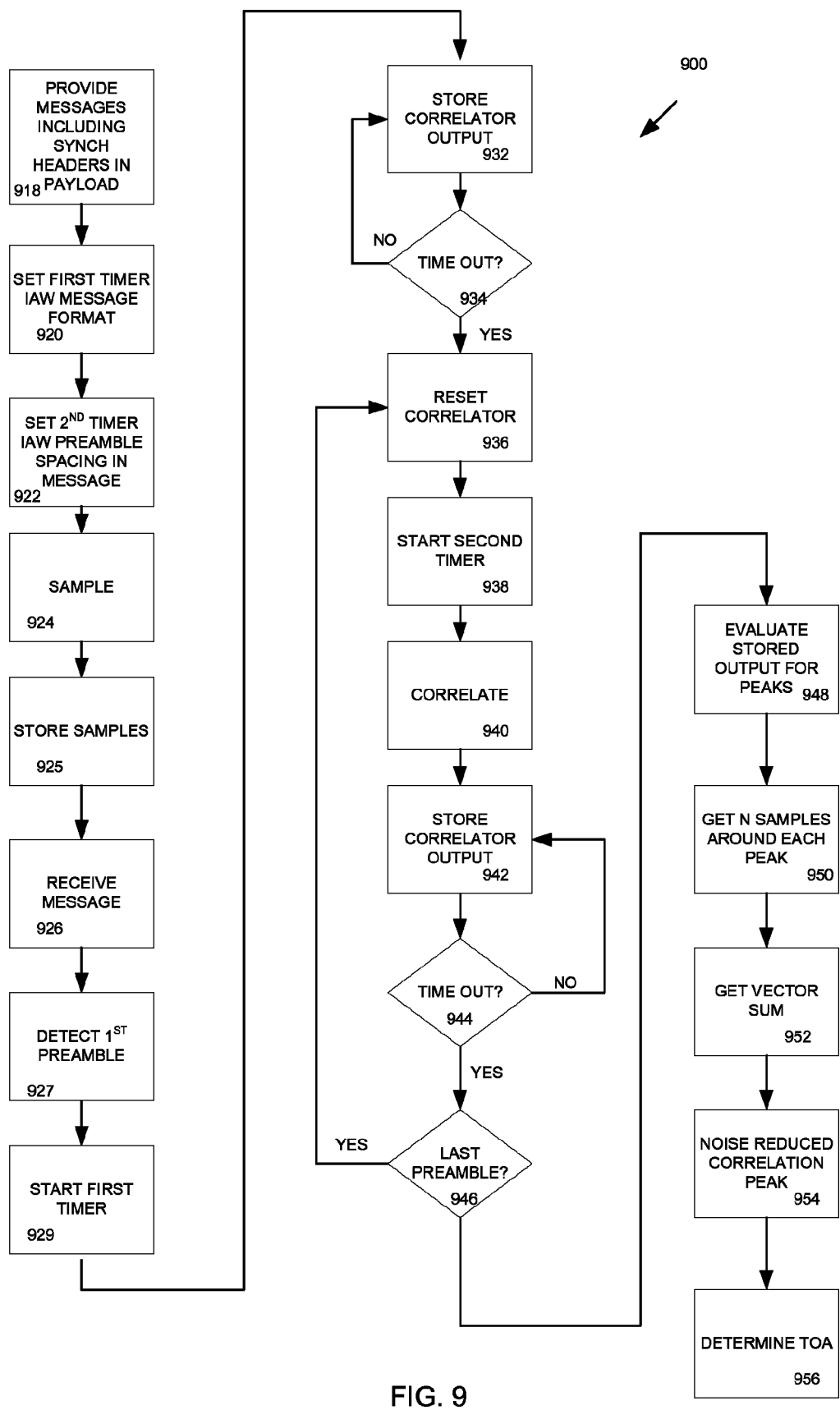
FIG. 9 is a flowchart illustrating steps of a method for radio ranging in a DS CDMA communication device of the type illustrated in FIG. 8.

The operation of device 800 will now be discussed in the context of the method illustrated in FIG. 9. At 918 messages are defined for systems implementing embodiments of the invention. For example, messages are defined as illustrated in FIG. 8A to include a plurality of synchronization headers within the frame payload portion of each message. At 920, first timer 880 is set in accordance with a first interval, for example the interval indicated at 892 of FIG. 8A. At 922, second timer 881 is set in accordance with a second interval, for example the interval indicated at 862 of FIG. 8A.

At 924, ADC 811 of receiver 850 carries out sampling and analog to digital conversion of the demodulated signal received at RF front end 808. The digital samples may be stored, as indicated at 925. At 926 a message having unit 800 as its destination is received by receiver 850. Preamble correlator 814 detects the message preamble at 927. Upon detection of the message preamble, controller 890 starts first timer 880 at 929. At the same time, preamble correlator 814 begins to provide its correlation process output to correlator storage 887. The output of preamble correlator 814 is stored until first timer 880 times out, as indicated at 934. When first timer 880 times out, correlator 814 is reset, i.e., is stopped and then restarted, as indicated at 936. At the same time, second timer 938 is started. Correlation processing continues as indicated at 940. The output of the correlation process is stored as indicated at 942.

Because first timer 880 is set to the first interval, its timeout occurs as the first copy of the synchronization header in the payload portion of the received message starts. Therefore, the correlator reset at the end of the first interval causes the correlator to stop and restart correlation processing on the first synchronization header copy in the message payload (synchronization header 2 illustrated in FIG. 8A). Correlation processing continues until second timer 881 times out, as indicated at 944. Controller 890 determines if the timeout occurred on the last synchronization header in the payload portion at 946. If the timeout did not occur on the last synchronization header, the correlator is reset, and second timer 881 once again counts the second interval at 938. Correlation processing continues at 940 and the correlator output is stored at 942.

If the timeout occurred on the last synchronization header in the payload portion of the packet, peak evaluator 882 evaluates the stored correlator output to detect correlation peaks. A correlation peak is expected for every synchronization peak comprising a received message. For a message comprising one synchronization header and nine synchronization headers in the payload portion of the message, ten correlation peaks would be expected. For each correlation peak detected by peak evaluator 882, a plurality N of samples around the detected correlation peak is obtained from sample memory 884, as indicated at 950. Therefore each message is defined by a plurality of groups of samples, one group for each correlation peak.

In one embodiment of the invention, N=7 samples. However, greater or fewer numbers of samples for each correlation peak are suitable for various embodiments of the invention. Preferably, N is selected between 5 and 9 such that the samples represent as much of the energy in the correlation peak as possible without wasting processing resources. At 952, peak evaluator 882 calculates the vector sum of the sample groups. The result of the calculation is an estimation of the correlation peak that reduces the contribution of noise to the estimation. A noise reduced correlation peak is provided at 954. At 956, a TOA for the received message is determined Because of the reduced contribution of noise in the calculation, the TOA accuracy is increased. The TOA is used by distance measuring unit 885 to determine distance of the message-sending transceiver from unit 800.

FIGS. 10 & 11

Figure 10:
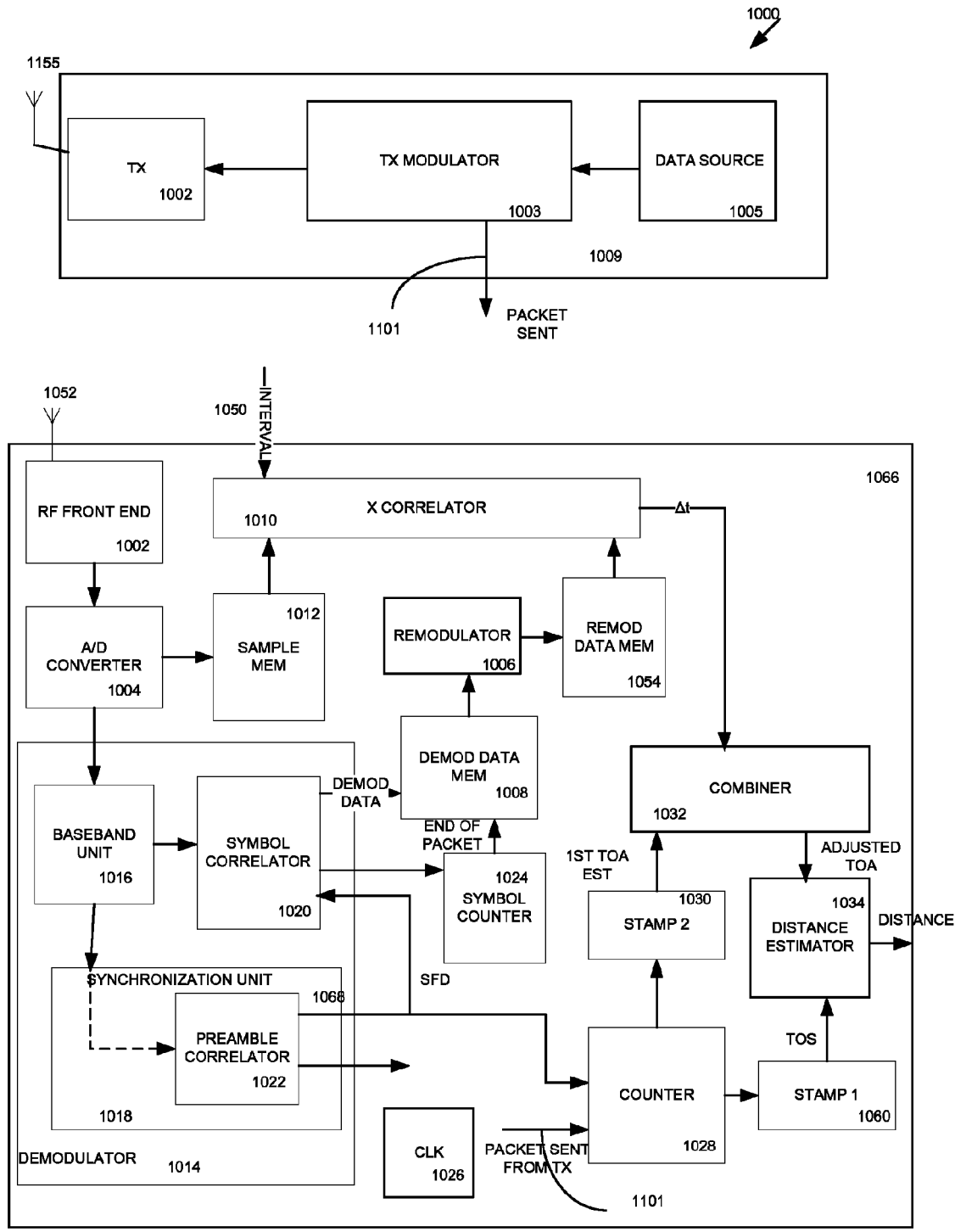
FIG. 10 is a block diagram of a communication device configured to provide radio ranging according to an embodiment of the invention.
Figure 11:
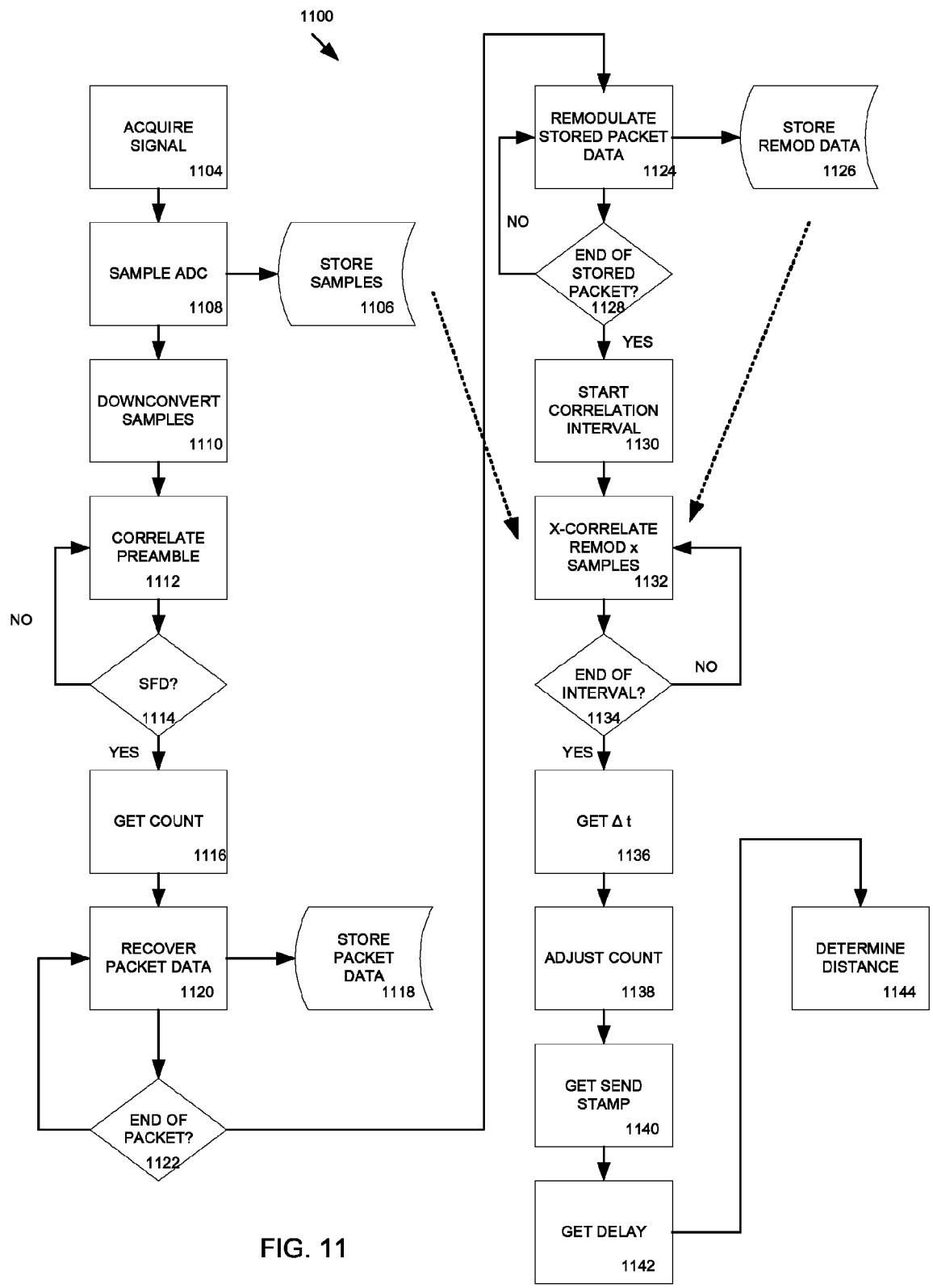
FIG. 11 is a flowchart illustrating steps of a method for radio ranging in a DS CDMA communication device of the type illustrated in FIG. 10.

FIG. 10 is a block diagram of a transceiver 1000 configured to for radio ranging according to an embodiment of the invention. FIG. 11 is a flowchart illustrating steps of a method for radio ranging in a DS CDMA communication device of the type illustrated in FIG. 10. The discussion below discusses the device with reference to the device elements and to the steps of the inventive method illustrated in FIG. 11.

The embodiment of the invention determines range from receiver 1066 to a target transceiver (not shown). Receiver 1066 determines range based on correlation over an entire message to accurately determine a time of arrival of the message at receiver 1066.

As illustrated in FIG. 10 a radio frequency (RF) transceiver 1000 comprises an RF transmitter 1009 and an RF receiver 1066. As will be appreciated by one of ordinary skill in the art, upon reading this specification, transmitter 1000 and receiver 1066, as illustrated in FIG. 10 are simplified for purposes of explanation. RF transmitter 1009 general comprises a source of data 1005 providing data to be transmitted and a modulator 1003 having an input for receiving the data to be transmitted from the source of data 1005.

Modulator 1003 is configured to modulate data from the source of data 1005 onto a carrier signal. The resulting modulated signal is provided to transmitter circuits 1002 for transmission by antenna 1155 over an air interface. In one embodiment of the invention, modulator 1003 provides an indication of packet transmission. In other embodiments of the invention, other components of transmitter 1009 provide an indication of packet transmission. For example, a processor controls transmitter 1009. The processor initiates transmission of a packet via a start transmission command provided to transmitter 1009. In that case, an indication of packet transmission can be derived from the processor command. Regardless of the source of a packet sent indicator, the packet sent indicator is provided to receiver 1066. Receiver 1066, in turn, derives a time of send (TOS) indicator from the packet sent indicator. The TOS indicator is stored as a first time stamp 1060, as will be explained in more detail below.

A direct sequence (DS), code division multiple access (CDMA) modulation scheme is suitable for implementing various embodiments of the invention. However, it is anticipated the invention will find application in other types of modulation schemes, and these remain within the intended scope of the invention. Various embodiments of the invention implement transceiver 1009 in accordance with IEEE standards. The selection of a particular IEEE standard to which to transmitter 1009 conforms depends on the particular application in which an embodiment of the invention is deployed.

RF receiver 1066 comprises an RF front end unit 1002 coupled to a receive antenna 1052. Receiver 1066 detects and decodes received signals to acquire packets having receiver 1066 as a destination. (Indicated at 1104 of FIG. 11) An analog to digital converter (ADC) 1004 samples RF signals received by RF front end 1002. (Indicated at 1108 of FIG. 11). ADC 1004 provides corresponding digital samples to baseband unit 1016 of demodulator 1014. ADC 1004 also provides the corresponding digital samples to sample memory 1012.

Baseband unit 1016 of demodulator 1014 provides down-converted demodulated digital samples to preamble correlator 1022 of synchronization unit 1018. (Indicated at 1110 of FIG. 11) Preamble correlator 1022 correlates preambles of the received down-converted samples ((Indicated at 1104 of FIG. 11) and provides an indication of receiving a start of frame delimiter (SFD) when correlator 1022 detects a preamble. (Indicated at 1114 of FIG. 11). A counter 1028 provides a count to second time stamp 1030 in response to receiving an SFD from preamble correlator 1022. (Indicated at 1116 of FIG. 11) Accordingly, second time stamp 1030 comprises a first TOA estimate. The first TOA estimate is provided from the second time stamp 1030 to a combiner 1032.

A symbol correlator receives demodulated samples from baseband unit 1016 and recovers data from the samples. (Indicated at 1104 of FIG. 1120) Symbol correlator 1020 provides recovered packet data corresponding to the demodulated samples to demodulated data memory 1008. (Indicated at 1118 of FIG. 11). A symbol counter 1024 counts symbols processed by symbol correlator 1020 to determine when the end of a received packet has been processed. (Indicated at 1122 of FIG. 11) Upon determining the end of a received packet, symbol counter 1024 provides an end of packet indication to demodulated data memory 1008. In response to receiving the end of packet indication from symbol counter 1024, demodulated data memory 1008 stops storing demodulated data.

In one embodiment of the invention, payload portions of received packets include an indication ($T_{DD}$) of a delay time attributable to a target transceiver processing. For example, a target transceiver measures the time between receiving a packet transmitted by transmitter 1009 and the target transmitter sending a response packet to receiver 1066. The target transceiver inserts an indication of that time (referred to herein as 'delay time' ($T_{DD}$)) into packets the target transmitter provides to receiver 1066. Alternatively, target transceiver provides a fixed delay time as an indication of turnaround delay. In that case, the demodulated data provided by symbol correlator 1020 includes the recovered delay time indicator ($T_{DD}$).

Baseband unit 1016 further provides demodulated data to preamble correlator 1022 of synchronization unit 1018. Preamble correlator 1022 detects a preamble of a message having receiver 1066 as a destination. Upon detection of the preamble, preamble correlator 1022 provides an indication of having detected a start of frame delimiter (SFD). In a typical receiver, the SFD is provided to the symbol correlator for use in synchronizing symbol correlation, for example by symbol correlator 1020. However, unlike conventional receivers, embodiments of the invention further provide the SFD to a counter 1028. In response to receiving the SFD the counter provides its current count as a second time stamp 1030. Second time stamp 1030 thereby provides an estimate of time of arrival (TOA) of the packet from which the SFD was derived.

As described above, demodulated data from symbol correlator 1020 is provided to and stored in a demodulated data memory 1008. A re-modulator 1006 receives data from the demodulated data memory and modulates the data, as if for transmission by transmitter 1066. (Indicated at 1124 of FIG. 11) However, rather than transmitting 're-modulated' data, receiver 1066 stores it in re-modulated data memory 1054. (Indicated at 1126 of FIG. 11) The storing operation for demodulated data memory 1008 commences with detection of an SFD by symbol correlator 1020 and stops in response to receiving an end of packet symbol provided by symbol counter 1008. (Indicated at 1128 of FIG. 11) As a result, demodulated data memory stores demodulated data association with a corresponding received packet.

Cross correlator 1010 receives stored samples from ADC 1004, and stored re-modulated data from data memory 1054. Cross correlator 1010 carries out a cross correlation operation on the stored samples and the stored re-modulated data. (Indicated at 1132 of FIG. 11). The cross correlation is carried out over a correlation interval. (Indicated at 1130 and 1134 of FIG. 11) The correlation interval is based on the receiver clock period. In one embodiment of the invention the correlation interval is set to the period of the receiver clock. However, the invention is not limited to this particular correlation interval. An alternative embodiment the correlation interval is set to one half of a chip period. The interval should be just long enough to cover the residual ambiguity in processing the preamble correlator output for TOA. For longer correlation periods computation complexity increases.

In one embodiment the cross correlation is performed after the entire packet has been received. In another embodiment the cross correlation is performed incrementally as decisions concerning the received data are made by the symbol correlator. As a result of the cross correlation, cross correlator 1010 provides an indication of a time difference Δt based on the results of the cross correlation. (Indicated at 1136 of FIG. 11) The time difference is provided to a combiner 1032.

Combiner 1032 receives the first TOA estimate from second stamp 1030. Combiner 1034 adjusts the first TOA estimate based on the time difference received from cross correlator 1010. (Indicated at 1138 of FIG. 11) In that manner, receiver 1066 improves the accuracy of the first TOA estimate. In some embodiments of the invention, the accuracy of the first TOA estimate is improved by an amount given by: sqrt (length of entire message/length of preamble). In one embodiment of the invention, receiver 1066 estimates TOA to an accuracy of up to 12.5 ns RMSE, wherein 12.5/5=2.5 ns RMSE (2.5 feet).

The adjusted TOA is provided to distance estimator 1034. Distance estimator 1034 further receives the TOS from first stamp 1060. (Indicated at 1140 of FIG. 11) Distance estimator 1034 determines distance between receiver 1066 and the transmitter from which the cross correlated samples were derived. (Indicated at 1144 of FIG. 11) Distance estimator 1034 carries out the distance determination based on the adjusted TOA and the TOS. In some embodiments of the invention distance estimator 1034 receives an indication of turnaround delay associated with a received packet. (Indicated at 1104 of FIG. 11) and accounts for this delay in determining distance.

Because the adjusted TOA is more accurate than the first TOA estimate, the estimated distance is correspondingly more accurate than would be the case if the first TOA estimate were used in the distance calculation. In that manner receiver 1066 provides ranging with a high accuracy. In one embodiment of the invention, receiver 1066 estimates TOA to an accuracy of up to 12.5 ns RMSE.

Figure 12:
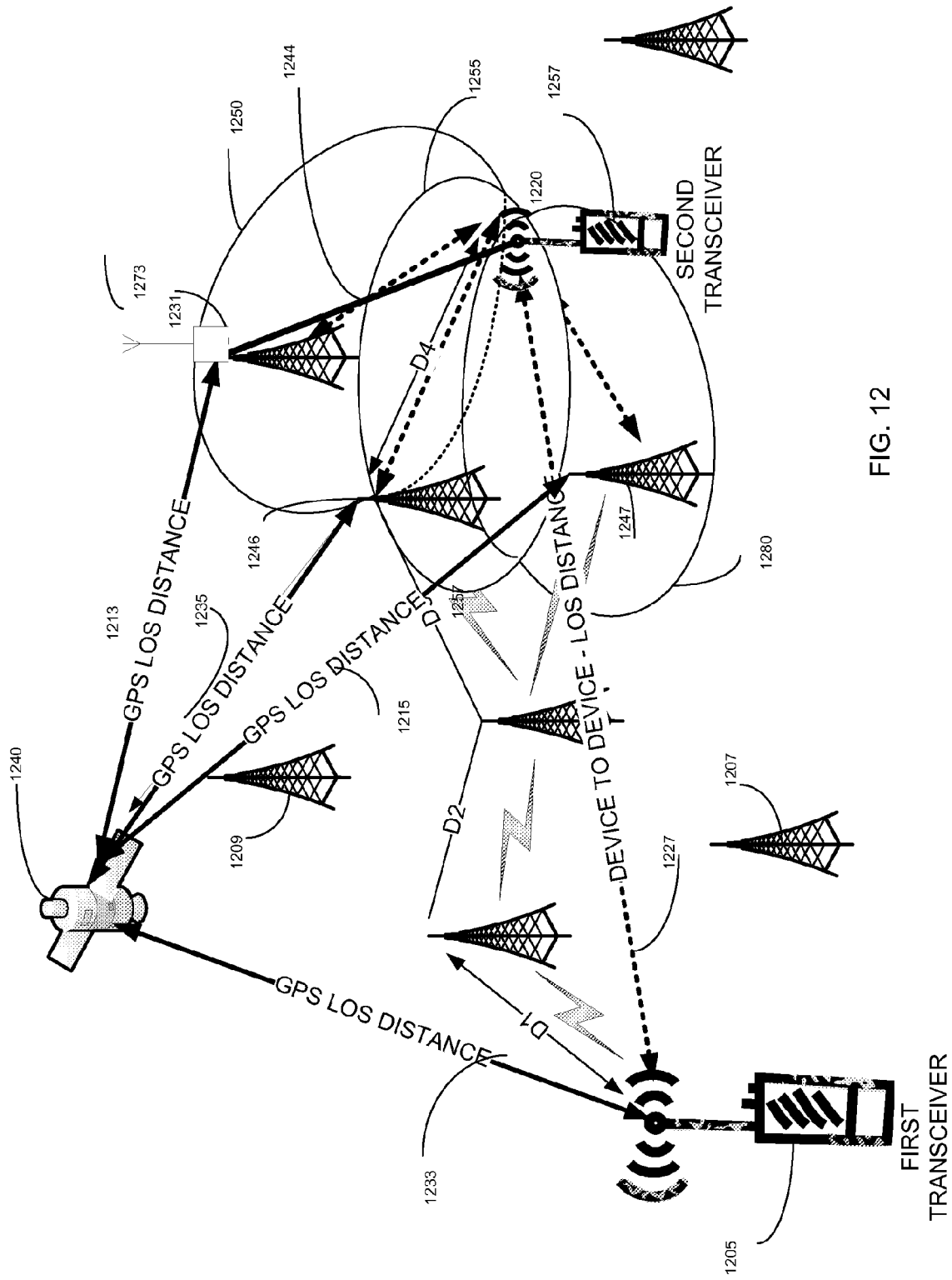
FIG. 12 is a pictorial diagram illustrating direct ranging as carried out by devices configured in accordance with embodiments of the invention.

FIG. 12 Direct Ranging

FIG. 12 is a pictorial diagram illustrating direct ranging as carried out by devices configured in accordance with embodiments of the invention described herein. FIG. 12 further illustrates one distinction between conventional GPS systems, and the ranging devices of the invention. A GPS satellite 1240 may be employed to determine position of devices, for example, second transceiver 1220. If second transceiver 1220 is in an environment unsuitable for receiving a GPS signal, GPS satellite 1240 may determine the devices position by first determining distance to a plurality of towers, e.g., 1231, 1246, and 1247. Based on the results of that determination, the GPS satellite may employ triangulation techniques, or other calculation approaches to estimate the position of second transceiver 1257.

When reception permits, GPS satellite 1240 may determine distance from satellite 1240 to a device, e.g., second transceiver 1257, but only if the device is equipped with a GPS transceiver. In that case, location is possible because the position of the GPS transceiver is known. In contrast, devices of the invention are capable of directly determining distance from one device to another, e.g., from first transceiver 1205 to second transceiver 1257, without knowing the position of either transceiver, and without reference to any known position. Therefore, for purposes of this specification, the term 'direct range determination' refers to range determination that is carried out by one device with respect to another, without the need to reference a known position, without communicating with a GPS satellite, and without relying on any GPS devices in transceivers 1205, 1207.

Accordingly, in one embodiment of the invention a radio communication tower, for example, tower 1231 and second communication device 1257 are equipped with respective transceivers according to any of the embodiments described herein. In that case a GPS satellite 1240 is enabled to more accurately determine distance, and position of second communication device 1257 by relying on ranging provided by device 1273 in tower 1231 to provide distance information from tower 1231 to second device 1257. The direct range determination provided by the devices of the invention may then be used in combination with GPS determined location information in a hybrid GPS system.

There have thus been provided new and improved methods and systems for decision directed time of arrival estimation in wireless radio ranging devices.

We claim:
1. A ranging device comprising:
an RF system integrated on a chip and including a receiver portion and a transmitter portion, the receiver portion comprising a preamble correlator coupled to a timing unit, the transmitter portion comprising a preamble SFD generator coupled to said timing unit:
the preamble correlator providing a start of frame delimiter (SFD) indicator to the timing unit when the receiver portion detects a start of frame delimiter (SFD);

the preamble SFD generator providing an internal indication of time of sending (TOS) a packet;

the timing unit coupled to said preamble correlator to receive said start of frame delimiter (SFD) indicator from said preamble correlator and further coupled to said preamble SFD generator to receive said indication of time of sending (TOS) a packet;

the timing unit configured to record a TOS stamp upon receiving said internal indication of time of sending (TOS) a packet from said preamble SFD generator;

the timing unit further configured to record a TOA stamp upon receiving said start of frame delimiter (SFD) indicator from said preamble correlator, and a range calculator coupled to said timing unit to receive said TOA stamp and said TOS stamp from said timing unit, said range calculator providing an estimate of distance to a target determined, in part, on a time difference between said TOA stamp and said TOS stamp.

2. The ranging device of claim 1 wherein said range calculator includes a counter controlled by said SFD and said TOS to provide a TOS time stamp and a TOA time stamp, and wherein said range calculator estimates a range to said target based, at least in part, on said difference.

3. A method for estimating a distance between a first transceiver and a second transceiver, the method comprising:

transmitting a first message including a first message synchronization portion by said first transceiver;

providing by said first transceiver, an internal indication of time of sending said first message;

receiving at said first transceiver a second message including a second synchronization portion from said second transceiver in response to sending said first message;

correlating at said first transceiver said first and second synchronization portions to provide an indication of correlation there-between;

determining by said first transceiver, said distance between said first transceiver and said second transceiver based, at least in part, upon said internal indication of time of sending and at least in part upon said indication of correlation.

4. The method of claim 3 wherein said second message includes an indication of turnaround time associated with said second transceiver and wherein said step of determining distance is carried out by said first transceiver based, at least in part, on said indication of turn-around time.

5. The method of claim 3 further including a step of displaying said distance on a display device of said first transceiver.

6. A ranging device comprising:

a radio frequency transmitter configured for transmitting message packets to a target, the transmitter disposed on a first integrated circuit chip and providing an internal indication of transmission of the message packets to the target;

a radio frequency receiver configured for receiving responsive message packets from the target, the receiver disposed on the first integrated circuit chip and providing an indication of receipt of the responsive message packets;

a distance measuring unit coupled to the transmitter to receive the indication of transmission and to the receiver to receive the indication of receipt, the distance measuring unit providing an indication of distance between the ranging device and the target based on the indications of transmission and receipt wherein the distance measuring unit comprises:

a timing unit coupled to the transmitter to receive the indication of transmission and to the receiver to receive the indication of receipt, the timing unit providing first and second time indications corresponding to the indications of transmission and receipt respectively;

a range calculator coupled to the timing unit to receive the first and second time indications, the range calculator estimating distance between the ranging device and the target based on the first and second time indications.

7. The ranging device of claim 6 wherein the transmitter includes:

a memory storing frames to comprise the message packets;

a generator providing a preamble for the frames and a delimiter for the preamble and the frames, wherein the indication of transmission of the radio frequency signal comprises the delimiter.

8. The ranging device of claim 6 wherein the radio frequency signal comprises symbols representing frames of data, a preamble and a delimiter there-between, and wherein the receiver includes a delimiter detector including an output indicating receipt of the corresponding message packets.

9. The ranging device of claim 6 further comprising a user interface coupled to said transmitter to provide messages from a user to be transmitted to the target, to the receiver to receive messages from the target, and to the distance measuring unit to receive the indication of distance.

10. The ranging device of claim 9 wherein the user interface comprises: an input device enabling a user to select at least one of a plurality of targets to receive the first message; the distance measuring unit providing an indication of distance between the ranging device and each user selected target.

* * * * *